US011518012B2

(12) United States Patent
Takeuchi et al.

(10) Patent No.: US 11,518,012 B2
(45) Date of Patent: Dec. 6, 2022

(54) ELECTRIC TOOL

(71) Applicant: MAX CO., LTD., Tokyo (JP)

(72) Inventors: Katsuki Takeuchi, Tokyo (JP); Kohei Suto, Tokyo (JP); Teruaki Ando, Tokyo (JP)

(73) Assignee: MAX CO., LTD., Tokyo (JP)

( * ) Notice: Subject to any disclaimer, the term of this patent is extended or adjusted under 35 U.S.C. 154(b) by 81 days.

(21) Appl. No.: 16/663,996

(22) Filed: Oct. 25, 2019

(65) Prior Publication Data

US 2020/0130156 A1    Apr. 30, 2020

(30) Foreign Application Priority Data

Oct. 26, 2018  (JP) .............................. JP2018-202170
Oct. 26, 2018  (JP) .............................. JP2018-202171

(51) Int. Cl.
  *B25C 1/00*    (2006.01)
  *B25C 1/06*    (2006.01)
  *H02P 29/64*   (2016.01)

(52) U.S. Cl.
  CPC ............... *B25C 1/008* (2013.01); *B25C 1/06* (2013.01); *H02P 29/64* (2016.02)

(58) Field of Classification Search
  CPC ............ B25C 1/008; B25C 1/06; H02P 29/64
  See application file for complete search history.

(56) References Cited

U.S. PATENT DOCUMENTS

| 2003/0071594 A1* | 4/2003 | Kleinau ............... H02P 29/68 318/567 |
| 2005/0217874 A1* | 10/2005 | Forster ................. B25F 5/00 173/1 |
| 2005/0217875 A1* | 10/2005 | Forster ................. B25C 1/06 173/1 |
| 2005/0220445 A1* | 10/2005 | Baskar ................. B25C 1/06 388/811 |

(Continued)

FOREIGN PATENT DOCUMENTS

| EP | 2184831 A2 | 5/2010 |
| EP | 2397260 A2 | 12/2011 |

(Continued)

OTHER PUBLICATIONS

The Extended European Search Report mailed in corresponding EP Patent Application No. 19205365.0 dated Nov. 10, 2020 (16 pages).

(Continued)

*Primary Examiner* — Nathaniel C Chukwurah
*Assistant Examiner* — Lucas E. A. Palmer
(74) *Attorney, Agent, or Firm* — Weihrouch IP

(57) ABSTRACT

An electric tool includes a motor, an operation part provided to be operable by a user, a motor drive control unit configured to perform control of driving the motor in response to the operation part being operated, a temperature sensor, and a temperature determination unit configured to determine overheating of the motor. The temperature determination unit is configured to estimate a temperature of the motor based on a drive situation of the motor and a detection result (Continued)

of the temperature sensor, and to determine the overheating of the motor based on the estimated temperature.

18 Claims, 17 Drawing Sheets

(56) References Cited

U.S. PATENT DOCUMENTS

| | | | | |
|---|---|---|---|---|
| 2010/0237124 A1* | 9/2010 | Shima | ........................ | B25C 1/06 227/8 |
| 2011/0303428 A1* | 12/2011 | Roth | ........................ | B25C 1/008 173/1 |
| 2011/0303718 A1* | 12/2011 | Spasov | ..................... | B25C 1/06 227/2 |
| 2014/0088753 A1* | 3/2014 | Lim | ........................ | B25F 5/021 700/168 |
| 2014/0207273 A1 | 7/2014 | Tsutsumi et al. | | |
| 2015/0022125 A1* | 1/2015 | Takano | ................... | B25F 5/008 318/139 |
| 2016/0008938 A1* | 1/2016 | Li | ........................... | H02K 11/25 318/565 |
| 2016/0184952 A1* | 6/2016 | Kabza | ................... | B23Q 15/12 173/2 |
| 2017/0012567 A1* | 1/2017 | Oohara | ................... | H02K 11/25 |
| 2018/0311806 A1* | 11/2018 | Mascall | ................... | B25F 5/001 |

FOREIGN PATENT DOCUMENTS

| | | | |
|---|---|---|---|
| EP | 2404708 | A2 | 2/2012 |
| EP | 2839932 | A1 | 2/2015 |
| EP | 3141349 | A1 | 3/2017 |
| JP | 2002-354886 | A | 6/2002 |
| JP | 2011-255483 | A | 12/2011 |
| JP | 2013-066960 | A | 4/2013 |
| JP | 2013066960 | A * | 4/2013 |
| JP | 2014-156005 | A | 8/2014 |
| JP | 2015-013327 | A | 1/2015 |
| JP | 2016-087697 | A | 5/2016 |
| JP | 2018-024064 | A | 2/2018 |
| WO | WO-2005097429 | A2 * | 10/2005 ........... H01H 47/004 |

OTHER PUBLICATIONS

The Partial European Search Report mailed in corresponding EP Patent Application No. 19205365.0 dated Apr. 20, 2020 (14 pages).
Japanese Office Action for Japanese Application No. 2018-202170 dated Jun. 21, 2022 (3 pp).
Japanese Office Action for Japanese Application No. 2018-202171 dated Jun. 21, 2022 (3 pp).
Japanese Office Action for Japanese Application No. 2018-202170 dated Aug. 30, 2022. (3 pp).

* cited by examiner

*FIG.13*

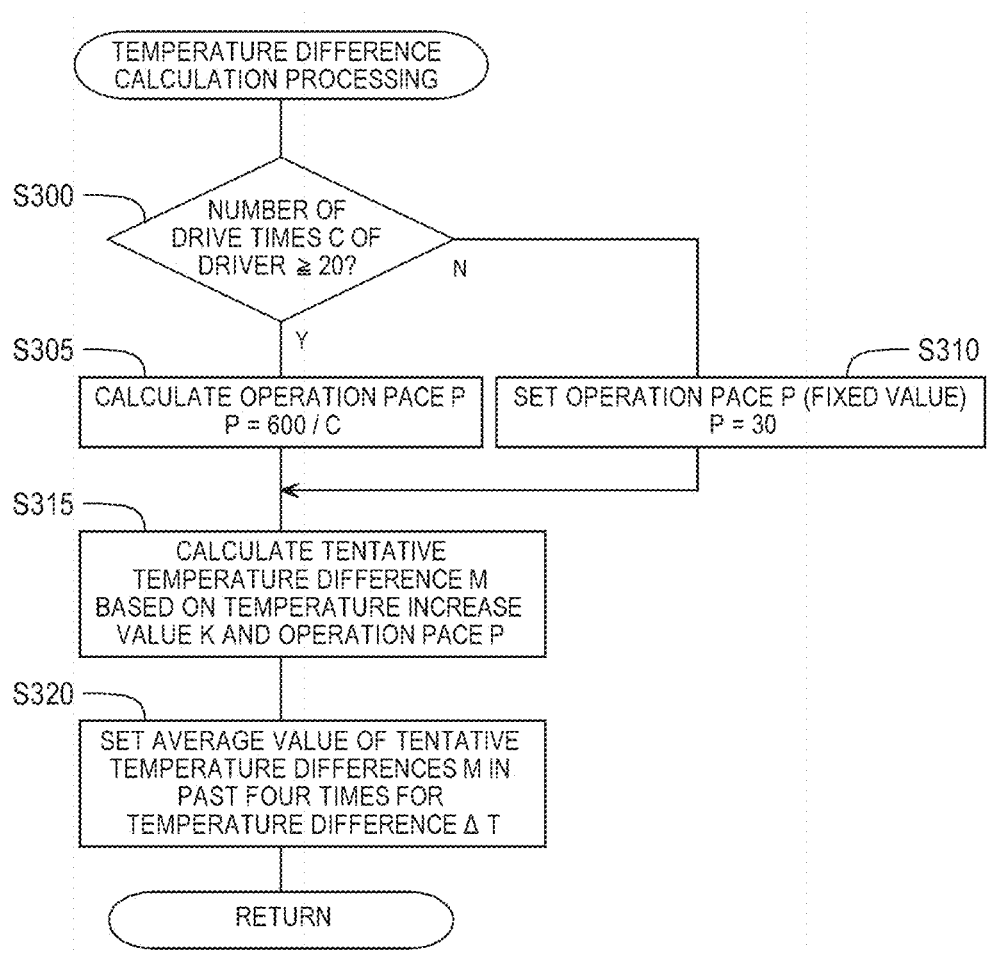

< CALCULATION EQUATION OF TENTATIVE TEMPERATURE DIFFERENCE M >

TENTATIVE TEMPERATURE DIFFERENCE $M = gK +$ CORRECTION VALUE
CORRECTION VALUE $= aP^2 - bP + c$

K : TEMPERATURE INCREASE VALUE FOR ONE MINUTE
P : OPERATION PACE FOR ONE MINUTE
g : SLOPE CALCULATED BY COMPARING TEMPERATURE INCREASE VALUE
    AND TEMPERATURE DIFFERENCE
a, b, c: CONSTANTS CALCULATED BY ACTUALLY MEASURING TEMPERATURE
    INCREASE VALUE AND TEMPERATURE DIFFERENCE

ELECTRIC TOOL

CROSS-REFERENCE TO RELATED APPLICATIONS

This application is based upon and claims the benefit of priority from prior Japanese patent application Nos. 2018-202170 and 2018-202171, both filed on Oct. 26, 2018, the entire contents of which are incorporated herein by reference.

TECHNICAL FIELD

Aspects of the present invention relate to an electric tool having a motor, and more particularly, to an electric tool having a function of protecting a motor against overload.

BACKGROUND ART

In an electric tool having a motor, the motor generates heat according to current flowing while the motor is driven and an energization time period of the motor. When an amount of heat generation of the motor increases, torque that can be output by the motor is reduced, so that sufficient performance may not be provided or problems such as layer short of a motor winding and motor burnout may be caused.

In order to solve the above problems, it is considered to use a high-output motor. Since the high-output motor has high heat resistance, the above problems are less likely to occur. However, since a size of the high-output motor is larger, the electric tool is enlarged, so that handling performance is lowered.

Accordingly, there is suggested an electric tool having means for detecting overload of the motor as a method of protecting the motor without increasing the size of the motor.

For example, JP-A-2013-66960 discloses an electric tool that has a motor temperature detection unit configured to detect a temperature of the motor and limit an output of the motor when a temperature value of the motor exceeds a temperature threshold value.

In order to avoid the problems such as the output reduction and burnout, it is advantageous to detect a temperature of a part having the highest temperature, such as a heat generating part. However, since an attachment position of the temperature detection means is limited depending on the configuration of the electric tool, it is difficult to detect the accurate temperature of the heat generating part. For example, in an electric tool having a brushed motor, it is difficult to attach the temperature detection means such as a thermistor to the heat generating part such as a winding and a brush. Therefore, the temperature detection means have to be attached to a case or a substrate in the vicinity of the heat generating part. That is, in such a situation where the temperature of the heat generating part cannot be directly measured, a temperature difference would occur between a temperature of the heat generating part and a measured temperature.

In order to make the temperature difference as small as possible, it is considered to correct the measured temperature. However, since the temperature difference varies depending on the amount of heat generation of the motor and environment temperatures, an error cannot be avoided.

When the error increases and the accurate temperature of the heat generating part cannot be thus detected, a protection function does not operate even though the temperature of the heat generating part exceeds an upper limit, or the protection function operates even though the temperature of the heat generating part does not increase so much. Therefore, the operability is lowered.

Further, in the above-described electric tool, since the motor output is limited at the moment when the temperature exceeds the temperature threshold value, the electric tool cannot be used suddenly during the working operation, so that the working operation is interrupted or the operation efficiency is lowered.

SUMMARY

Accordingly, an aspect of the present invention provides an electric tool capable of protecting a motor in correspondence to an actual temperature of a heat generating part, even if a temperature of the heat generating part cannot be directly measured.

Further, another aspect of the present invention provides an electric tool that can be used without lowering operation efficiency as much as possible while appropriately protecting a motor.

According to an exemplary embodiment of the present invention, there is provided an electric tool including: a motor; an operation part provided to be operable by a user; a motor drive control unit configured to perform control of driving the motor in response to the operation part being operated; a temperature sensor; and a temperature determination unit configured to determine overheating of the motor, wherein the temperature determination unit is configured to estimate a temperature of the motor based on a drive situation of the motor and a detection result of the temperature sensor, and to determine the overheating of the motor based on the estimated temperature.

Accordingly, the above-described electric tool includes the temperature determination unit configured to determine the overheating of the motor, and the temperature determination unit is configured to estimate the temperature of the motor based on the drive situation of the motor and the detection result of the temperature sensor. According to this configuration, even in a case where the temperature sensor cannot be attached to the heat generating part such as a winding and a brush and the temperature difference thus occurs between the detected temperature of the temperature sensor and the temperature of the heat generating part, an estimation error of the motor temperature can be reduced. For example, when the motor is continuously driven and the operation pace is thus fast, the temperature of the motor rapidly increases. In this case, the surrounding temperature cannot follow up the motor temperature, so that the temperature difference between the surrounding temperature detected by the temperature sensor and the actual motor temperature increases. In this case, the temperature of the motor is corrected on assumption of the large temperature difference. In contrast, when the operation pace is slow, since the temperature difference between the surrounding temperature and the actual motor temperature is small, the temperature of the motor is estimated with reducing the correction value. By performing such processing, the accuracy of the temperature detection is improved, so that the overload of the motor can be accurately detected. For example, it may be possible to avoid the problems that a protection function does not operate even though the motor temperature exceeds an upper limit and thus a failure occurs, and that the protection function operates even though the motor temperature does not increase so much, thereby lowering the operability. The protection function accurately operates, so that the motor can be safely used without using a high-output motor. Therefore, the weight reduction and miniaturization of the electric tool can be realized.

In the meantime, the motor drive control unit may be configured to limit an output of the motor (for example, not drive the motor) when the operation part is operated in a state where the temperature determination unit detects the overheating of the motor. According to this configuration, the motor can be prevented from being used in the overheated state.

Also, the temperature determination unit may be configured to estimate the temperature of the motor at least using the drive situation (for example, drive time period) of the motor for a predetermined fixed period and a change in temperature detected by the temperature sensor for the fixed period. According to this configuration, the temperature detection can be realized with higher accuracy.

The inventive concept of present invention may be applied to a striking tool having a driver configured to strike a fastener, wherein the temperature determination unit may be configured to calculate the operation pace based on a number of drive times of the driver, and to estimate the temperature of the motor based on the operation pace and the detection result of the temperature sensor.

According to another exemplary embodiment of the present invention, there is provided a An electric tool including: a motor; an operation part provided to be operable by a user; and a control device including: a motor drive control unit configured to perform control of driving the motor in response to the operation part being operated; and a temperature determination unit configured to compare a temperature of a heat generating part with a predetermined threshold value, wherein a first threshold value and a second threshold value greater than the first threshold value are set as the predetermined threshold value, wherein the control device is configured to notify a user of an increase in temperature when the temperature determination unit determines that the temperature of the heat generating part is higher than the first threshold value, and to limit an output of the motor when the temperature determination unit determines that the temperature of the heat generating part is higher than the second threshold value.

Accordingly, in the above-described electric tool, the first threshold value and the second threshold value greater than the first threshold value are set. When the temperature determination unit determines that the temperature of the heat generating part (an internal temperature of the motor, and the like) is higher than the first threshold value, the increase in temperature is notified to the user, and when the temperature determination unit determines that the temperature of the heat generating part is higher than the second threshold value, the output of the motor is limited. According to this configuration, when the temperature of the heat generating part increases, the notification to the user is first performed, and then when the temperature of the heat generating part further increases, the output of the motor is limited. Therefore, for example, even when the motor is in the high temperature and the tool cannot be thus used, the notification to the user is performed beforehand, so that the problem of the sudden interruption of working operation can be avoided.

In the meantime, the notification to the operator may be performed by changing a drive mode of the motor. According to this configuration, the operator can feel uncomfortable due to the drive of the motor, so that the operator can feel the increase in temperature intuitively. For example, in a noisy working operation site, it may be difficult for the operator to recognize notification by a buzzer. Also, it may be difficult for the operator to recognize blinking or lighting of a lamp at the outside. In contrast, if the notification is performed by the drive mode of the motor, instead of or in addition to the conventional notification by sound or light, the user can easily recognize the notification.

For example, in a striking tool configured to strike a fastener from an ejecting port, a stop position of a plunger may be made different when performing the notification and when not performing the notification. Specifically, when not performing the notification, the plunger may be moved and stopped in a normal standby position where predetermined urging force is accumulated in a plunger urging member, after striking out a fastener by a driver. When performing the notification, the plunger may be moved and stopped in a standby position for notification in which the urging force accumulated in the plunger urging member is less than in the normal standby position. That is, a distance to a position of a top dead center may be set greater for the plunger 32 located in the standby position for notification than for the plunger 32 located in the normal standby position. According to this configuration, in the case where the notification is being performed, a time period after the operator operates the operation unit until a fastener is actually struck out is longer than the case where the notification is not performed. In this way, the time for striking is prolonged, so that the operator can recognize the increase in temperature sensuously. Also, since the time for striking is prolonged, there is also an interval between the striking operations, so that the increase in temperature can be suppressed by reducing load of the motor.

The notification may be performed by delaying a time period after the operation part is operated until the motor is driven. Even with this configuration, the operator can recognize the increase in temperature sensuously. In addition, since there is also an interval between the striking operations, the increase in temperature can be suppressed by reducing load of the motor.

Also, the notification may be performed by reducing the number of rotations (rotation speed) of the motor as compared to a case where the notification is not performed. Even with this configuration, the operator can recognize the increase in temperature sensuously. Also, since the number of rotations of the motor is reduced, the increase in temperature can be suppressed by reducing load of the motor.

BRIEF DESCRIPTION OF DRAWINGS

FIGS. 7A to 7E illustrate an operation in which the plunger is pushed up by a drive mechanism, wherein FIG. 7A is a front view of the drive mechanism, FIG. 7B schematically illustrates the drive mechanism in a state where the plunger is located in a bottom dead center, FIG. 7C schematically illustrates the drive mechanism in a state where the plunger is located between the bottom dead center and a top dead center (in a normal standby position), FIG. 7D schematically illustrates the drive mechanism in a state where the plunger is located in the top dead center, and FIG. 7E schematically illustrates the drive mechanism immediately after engagement between the plunger and the drive mechanism is released.

FIG. 13 is a flowchart illustrating temperature difference calculation processing.

DETAILED DESCRIPTION OF EMBODIMENTS

Exemplary embodiments of the present invention will be described with reference to the drawings.

An electric tool 10 according to an exemplary embodiment is a spring-driven striking tool configured to drive by spring force. In the exemplary embodiment, the striking tool is exemplified as the electric tool 10. However, the electric tool 10 is not limited to the striking tool, and any tool using a motor 17 is applicable. For example, an electric driver, a cutting tool and the like are also applicable. As the electric tool 10, a charge-type tool using a battery 55 and a tool configured to operate by an external power supply are also applicable.

Figure 1:
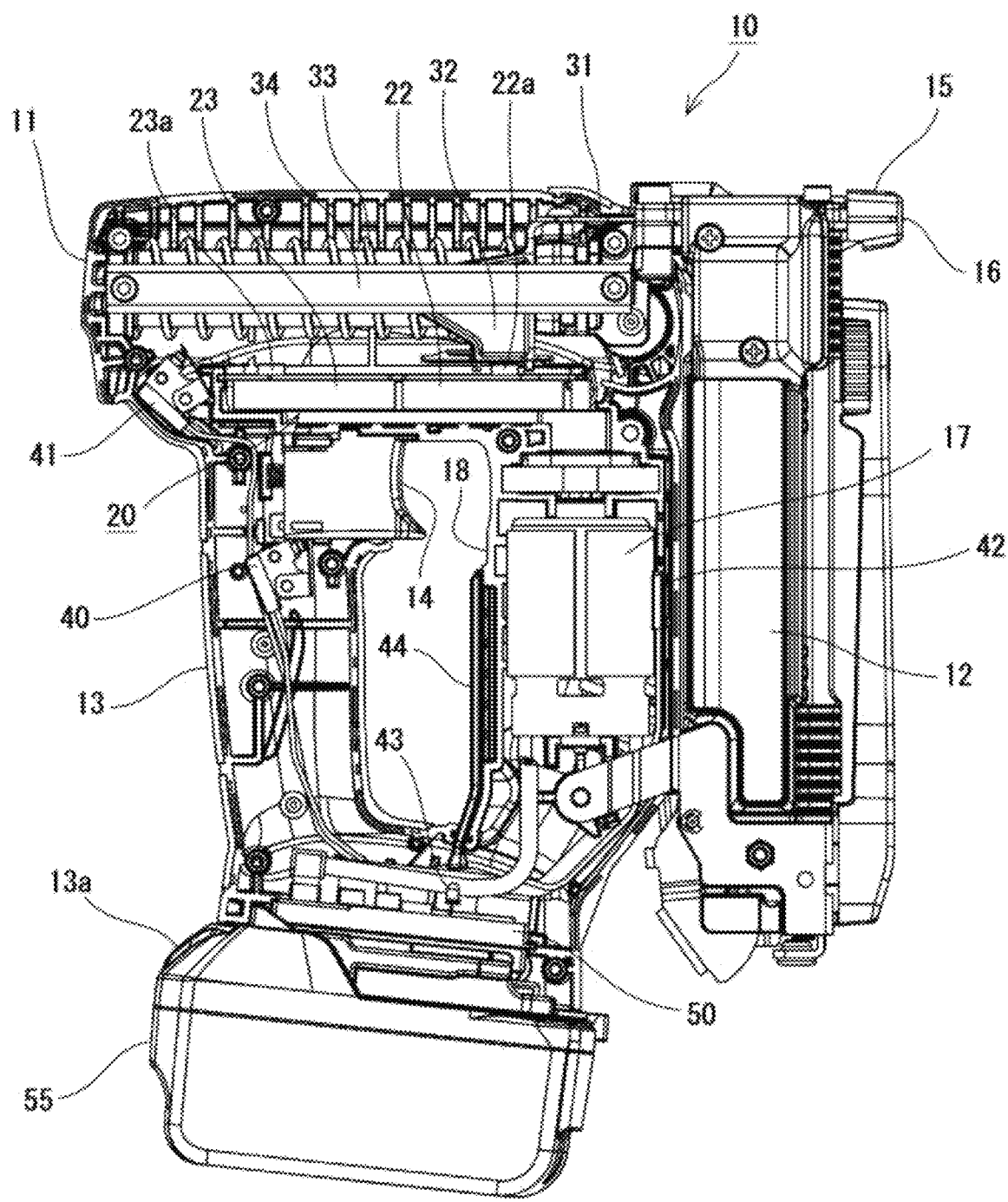
FIG. 1 is a side view illustrating an internal structure of an electric tool.

As shown in FIG. 1, the electric tool 10 of the exemplary embodiment includes a motor 17 in a housing, and is configured to drive by the motor 17 to strike out a fastener from an ejecting port 16 provided at a tip end of the tool.

As shown in FIG. 1, the electric tool 10 includes an output part 11 having a drive mechanism 20 accommodated therein, a magazine 12 connected to a tip end side of the output part 11 perpendicularly to the output part 11, a grip 13 connected to a rear end side of the output part 11 perpendicularly to the output part 11, and a motor accommodation part 18 arranged along an inner side of the magazine 12.

The tip end of the output part 11 is provided with a nose part 15, which is to be pressed to a member to be struck, and a leading fastener loaded in the magazine 12 is supplied to the nose part 15 by a supply device (not shown). The fastener supplied to the nose part 15 is struck from the ejecting port 16 provided at the tip end of the nose part 15 by a driver 31.

As shown in FIG. 1, in the output part 11, a driver 31 provided to be slidable toward the ejecting port 16 so as to strike out a fastener, a plunger 32 to which the driver 31 is coupled, a plunger urging member 33 configured to urge the plunger 32 toward the ejecting port 16, a guide member 34 configured to guide movement of the plunger 32, a drive mechanism 20 for actuating the plunger 32, a brake switch 41 for detecting a position of the plunger 32, and the like are arranged.

The driver 31 of the exemplary embodiment is a plate for striking a fastener. The driver 31 is coupled integrally with the plunger 32, and is slid toward the ejecting port 16 when the plunger 32 is actuated by urging force of the plunger urging member 33, thereby striking out the fastener from the ejecting port 16.

Figure 2:
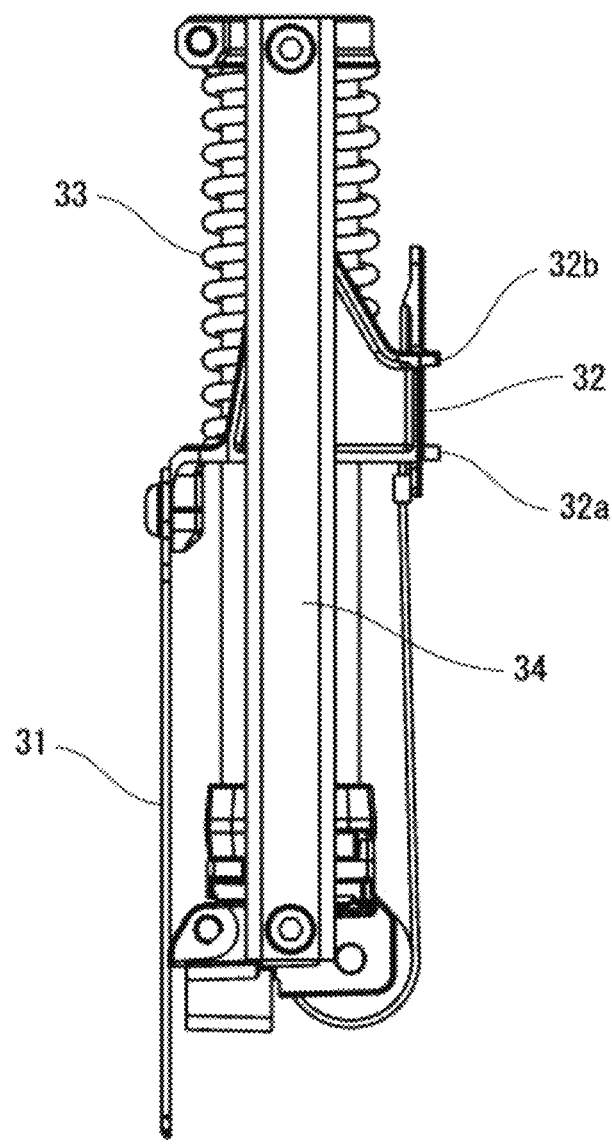
FIG. 2 is a side view of components configuring a driver and a plunger.

As shown in FIG. 2, the plunger 32 is slidably guided by the guide member 34, and is urged toward the ejecting port 16 all the time by the plunger urging member 33, which is a compression spring.

The plunger 32 is arranged in the vicinity of the drive mechanism 20 (described later), and has a first engagement portion 32a and a second engagement portion 32b protruding from a surface facing the drive mechanism 20. The first engagement portion 32a and the second engagement portion 32b are projections for engaging with the drive mechanism 20, and are provided with different distances from the ejecting port 16. Specifically, the first engagement portion 32a is provided in a position closer to the ejecting port 16 than the second engagement portion 32b.

The drive mechanism 20 is a mechanism configured to push up the plunger 32 against the urging force of the plunger urging member 33. The drive mechanism 20 is configured to move the plunger 32 using the motor 17 as a power source, to accumulate the urging force in the plunger urging member 33, and to release the urging force in a drive to instantaneously slide the plunger 32, thereby performing a striking operation.

The drive mechanism 20 includes a plurality of gears as shown in FIGS. 7A to 7E. The plurality of gears are configured to rotate by drive force of the motor 17. The drive mechanism 20 is configured to rotate the gears in a state where the plunger 32 is engaged to the gears, thereby pushing up the plunger 32. The drive mechanism is configured to move the plunger 32 with the urging force of the plunger urging member 33 and to slide the driver 31 coupled to the plunger 32 toward the ejecting port 16 by releasing the engagement between the gears and the plunger 32, thereby striking out a fastener.

Figure 7:
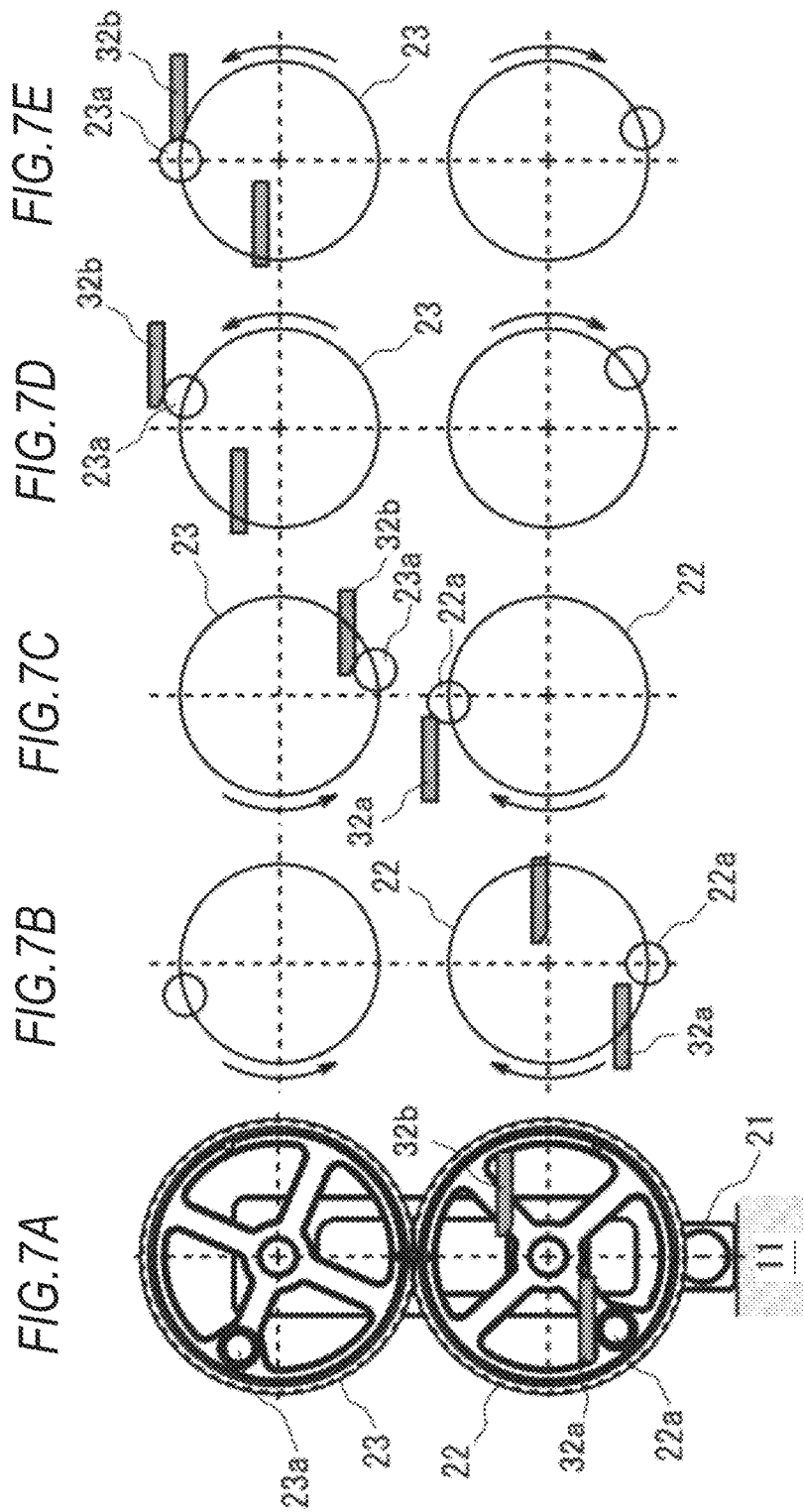

As shown in FIG. 7A, the drive mechanism 20 includes a torque gear plate 21 fixed to a housing of the output part 11, and a first torque gear 22 and a second torque gear 23 pivotally supported to the torque gear plate 21. The first torque gear 22 and the second torque gear 23 are arranged side by side in a sliding direction of the plunger 32, and the first torque gear 22 is arranged closer to the ejecting port 16 than the second torque gear 23. Accordingly, the plunger 32 is engaged in order from the first torque gear 22 to the second torque gear 23, and is thus gradually raised.

FIG. 7B illustrates a state where the plunger 32 is located in a position of a bottom dead center (a state where the striking of the fastener by the driver 31 is completed). When the first torque gear 22 and the second torque gear 23 are rotated from this state, a first torque roller 22a provided in an eccentric position of the first torque gear 22 is engaged to a first engagement portion 32a of the plunger 32.

Then, as shown in FIG. 7C, the plunger 32 is raised upwards by the first torque gear 22. When the first torque gear 22 is rotated up to a position where the first torque roller 22a is located at the top, the engagement between the first torque roller 22a and the first engagement portion 32a is released. At this time, before the engagement between the first torque roller 22a and the first engagement portion 32a is released, a second torque roller 23a provided in an eccentric position of the second torque gear 23 is engaged to a second engagement portion 32b of the plunger 32.

Then, as shown in FIG. 7D, the plunger 32 is raised upward by the second torque gear 23, and the plunger 32 is moved to a position of a top dead center.

Thereafter, as shown in FIG. 7E, when the second torque gear 23 is rotated up to a position where the second torque roller 23a is located at the top, the engagement between the second torque roller 23a and the second engagement portion 32b is released. Accordingly, the engagement between the plunger 32 and the drive mechanism 20 is released and the urging force of the plunger urging member 33 is released, so that the plunger 32 is instantaneously moved to the position of the bottom dead center shown in FIG. 7B. Accordingly, the driver 31 coupled to the plunger 32 is slid toward the ejecting port 16, thereby striking out a fastener.

In the exemplary embodiment, the plunger 32 before the striking is configured to be in a normal standby position (a position on the way from the bottom dead center to the top dead center) shown in FIG. 7C. When an operation part 14 (described later) is operated, the drive mechanism 20 is actuated, so that the plunger is again in the normal standby position shown in FIG. 7C through the states in order of FIG. 7D->FIG. 7E->FIG. 7B (except a case where a notification (described later) is performed).

Figure 9:
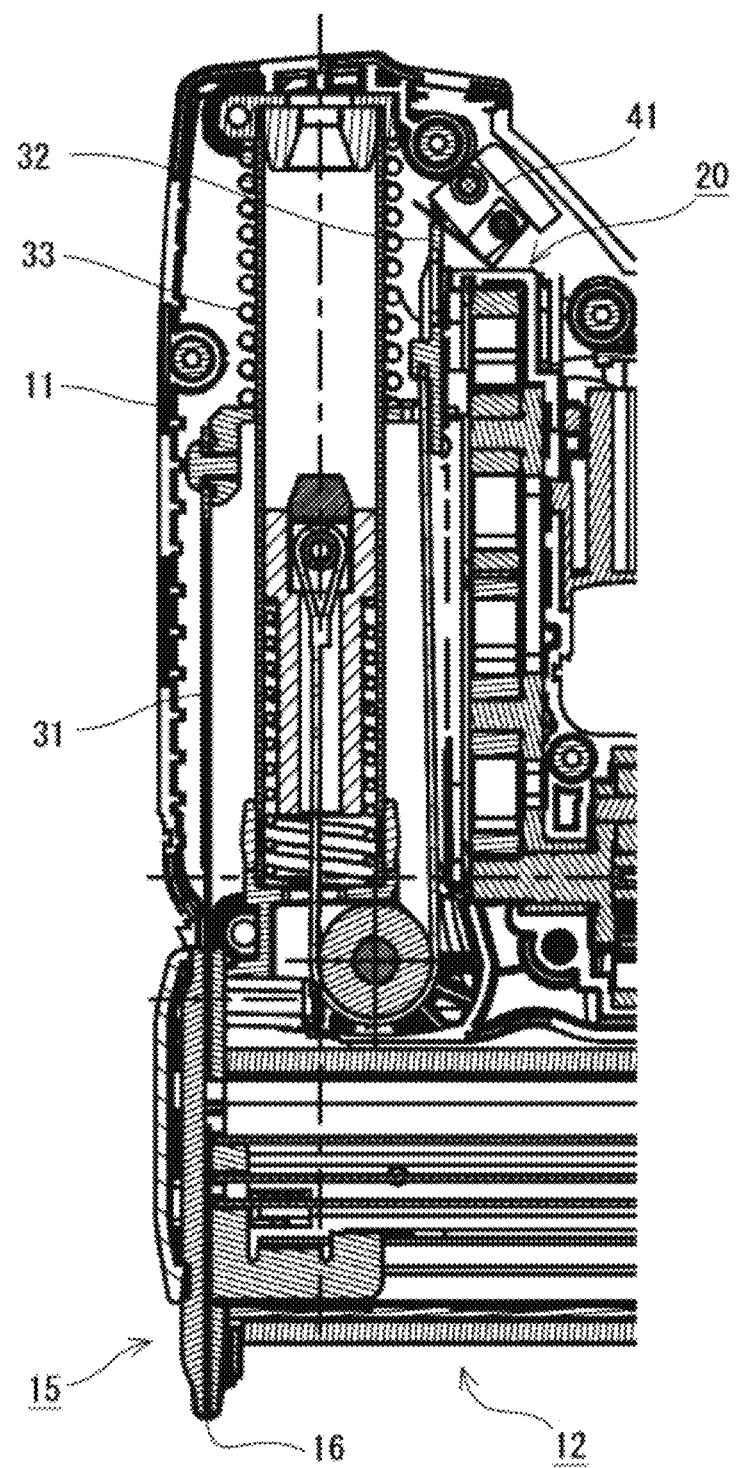
FIG. 9 is a partially enlarged side sectional view illustrating the internal structure of the electric tool in the state where the plunger is located in the top dead center.

As shown in FIG. 9, the brake switch 41 is arranged in a position where it is pushed by the plunger 32 when the plunger 32 is located in the position of the top dead center. When the brake switch 41 is pushed, a brake signal is output to a control device 100 (described later). The control device 100 stops the drive of the motor 17 when the brake signal is input.

The magazine 12 is configured to load therein fasteners that are to be struck out by the driver 31. In the electric tool of the exemplary embodiment, a fastener having a plurality of fasteners coupled side by side is loaded in the magazine 12.

The grip 13 is a part that is to be gripped by an operator who uses the electric tool 10. The grip 13 has a rod shape such that the operator can easily grip the grip 13. An operation part 14 that can be pulled by an index finger of the operator is provided in a position where the index finger is put thereon when the operator grips the grip 13. When the operation part 14 is operated, a trigger switch 40 arranged in the grip 13 becomes on, so that an operation signal is output to the control device 100 (described later). The control device 100 starts to drive the motor 17 when the operation signal is input.

A rear end of the grip 13 (an end on an opposite side to the output part 11) is formed with a battery mounting part 13a for mounting a battery 55 thereto. The electric tool 10 of the exemplary embodiment is configured to drive by power that is fed from the battery 55 mounted to the battery mounting part 13a. The battery 55 has a secondary battery therein, and can be removed from the electric tool 10 for charging. In the battery mounting part 13a, a substrate 50 having components such as a CPU, a RAM and the like mounted thereon is arranged. The CPU and the RAM mounted on the substrate 50 configure the control device 100 for controlling actuation of the electric tool 10.

Figure 3:
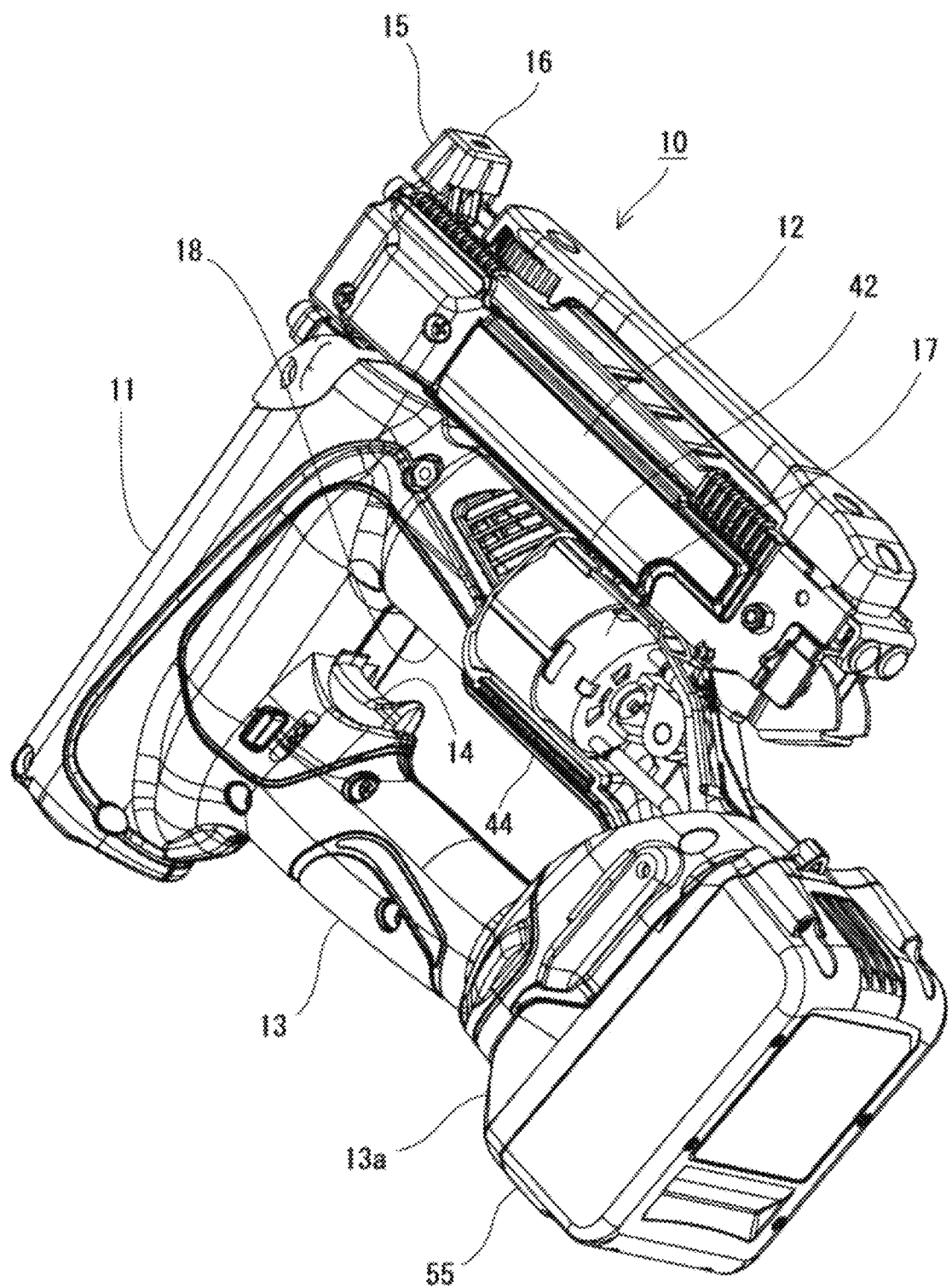
FIG. 3 is a perspective view illustrating the internal structure of the electric tool.

The motor accommodation part 18 is a part for accommodating the motor 17. The motor accommodation part 18 of the exemplary embodiment is arranged on a side of the magazine 12 facing the grip 13 so as to face the grip 13. A light guide member 44 as shown in FIGS. 1 and 3 is arranged on a surface of the motor accommodation part 18. The light guide member 44 is configured to guide light of an LED 43 mounted on the substrate 50 to an outside. When the LED 43 is turned on, the surface of the light guide member 44 emits light, so that the light of the LED 43 can be easily visually recognized from the outside.

Figure 5A:
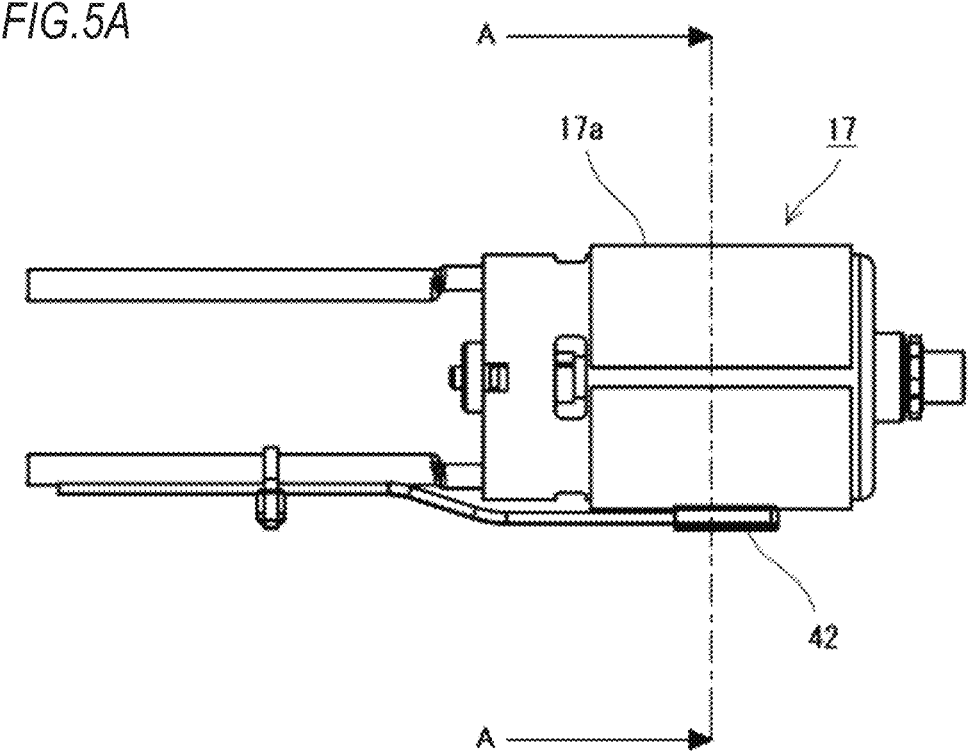
FIG. 5A is a side view of the motor.
Figure 5B:
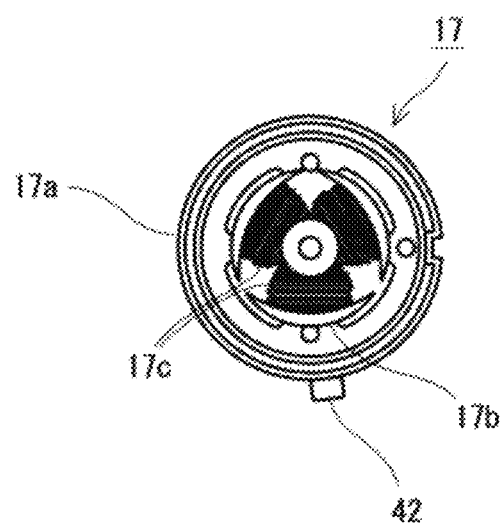
FIG. 5B is a sectional view taken along a line A-A.

As shown in FIG. 5, the motor 17 of the exemplary embodiment is a brushed motor in which a rotor 17b is accommodated in a motor case 17a. A winding 17c for enabling current to flow is wound on a commutator of the rotor 17b.

Figure 4:
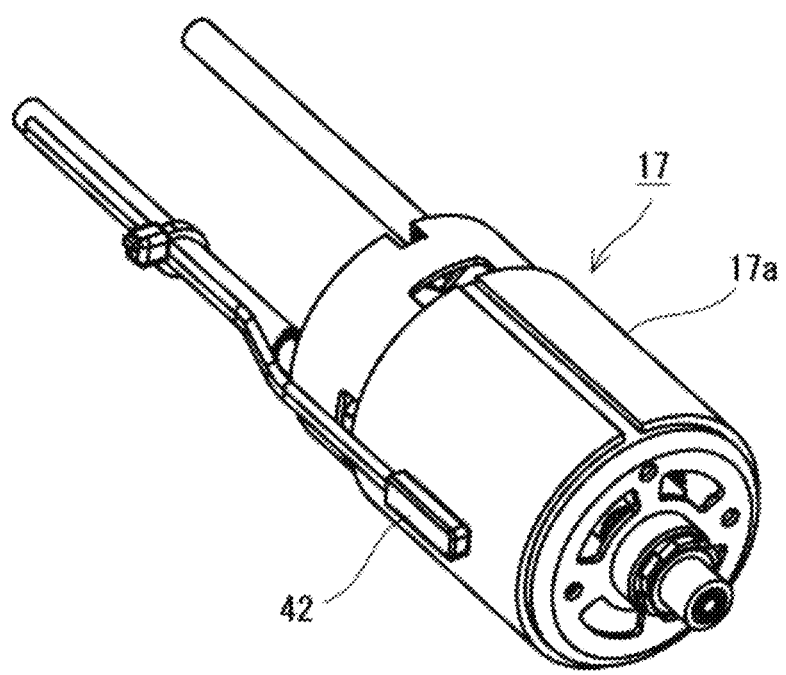
FIG. 4 is a perspective view of a motor.

A temperature sensor 42 for detecting a change in temperature of the motor 17 is provided in the vicinity of the motor 17. As shown in FIGS. 3 and 4, the temperature sensor 42 of the exemplary embodiment is attached on a surface of the motor case 17a so as to detect a surface temperature of the motor 17. The surface temperature of the motor 17 detected by the temperature sensor 42 is output to the control device 100 for control. In the meantime, the position where the temperature sensor 42 is attached is not limited to the surface of the motor case 17a, and can be appropriately changed, considering a wiring, an internal layout and the like. In the exemplary embodiment, a measured value detected by the temperature sensor 42 is not used as it is for control, and a temperature of the heat generating part is estimated based on the measured value. Therefore, the temperature sensor 42 may be arranged in any position where the change in temperature of the motor 17 can be measured. For example, the temperature sensor 42 may be arranged in a space close to but not contacting the motor 17 or the temperature sensor 42 may be attached to a main body housing that surrounds the motor 17.

Herein, the above-described operations of the electric tool 10 are controlled by the control device 100. The control device 100 is mainly configured by a CPU, and includes a ROM, a RAM, an I/O and the like. The CPU reads a program stored in the ROM, so that a variety of input devices and output devices are controlled.

Figure 6:
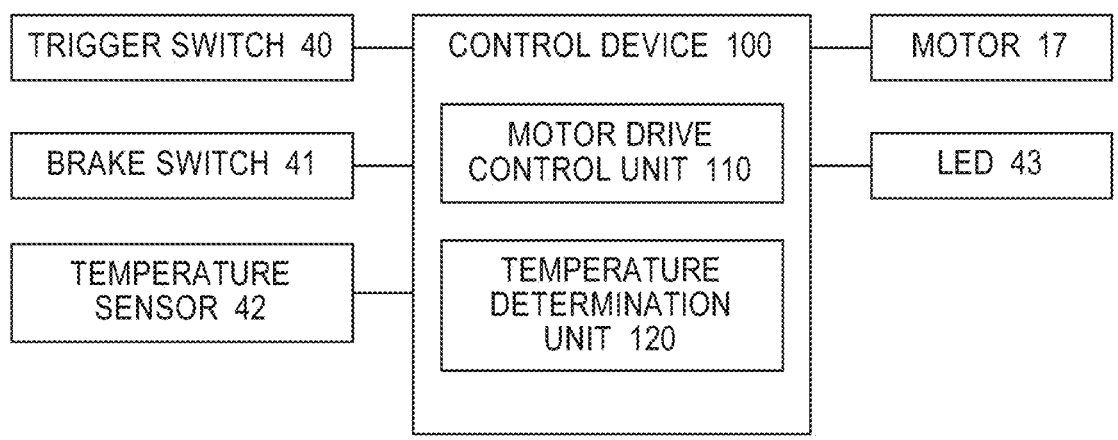
FIG. 6 is a block diagram schematically illustrating a configuration of the electric tool.

As shown in FIG. 6, the trigger switch 40, the brake switch 41, the temperature sensor 42 and the like are provided as the input device of the control device 100. In the meantime, the input device is not limited thereto, and other input devices may be provided.

The motor 17, the LED 43 and the like are provided as the output device of the control device 100. In the meantime, the output device is not limited thereto, and other output devices may be provided.

The control device 100 is configured to control the various types of devices, and is configured to execute predetermined programs, thereby functioning as a motor drive control unit 110 and a temperature determination unit 120.

The motor drive control unit 110 is configured to control the drive of the motor 17. The motor drive control unit 110 drives the motor 17 in response to the operation part 14 being operated, and stops the motor 17 when a state of the brake switch 41 is changed.

Figure 8:
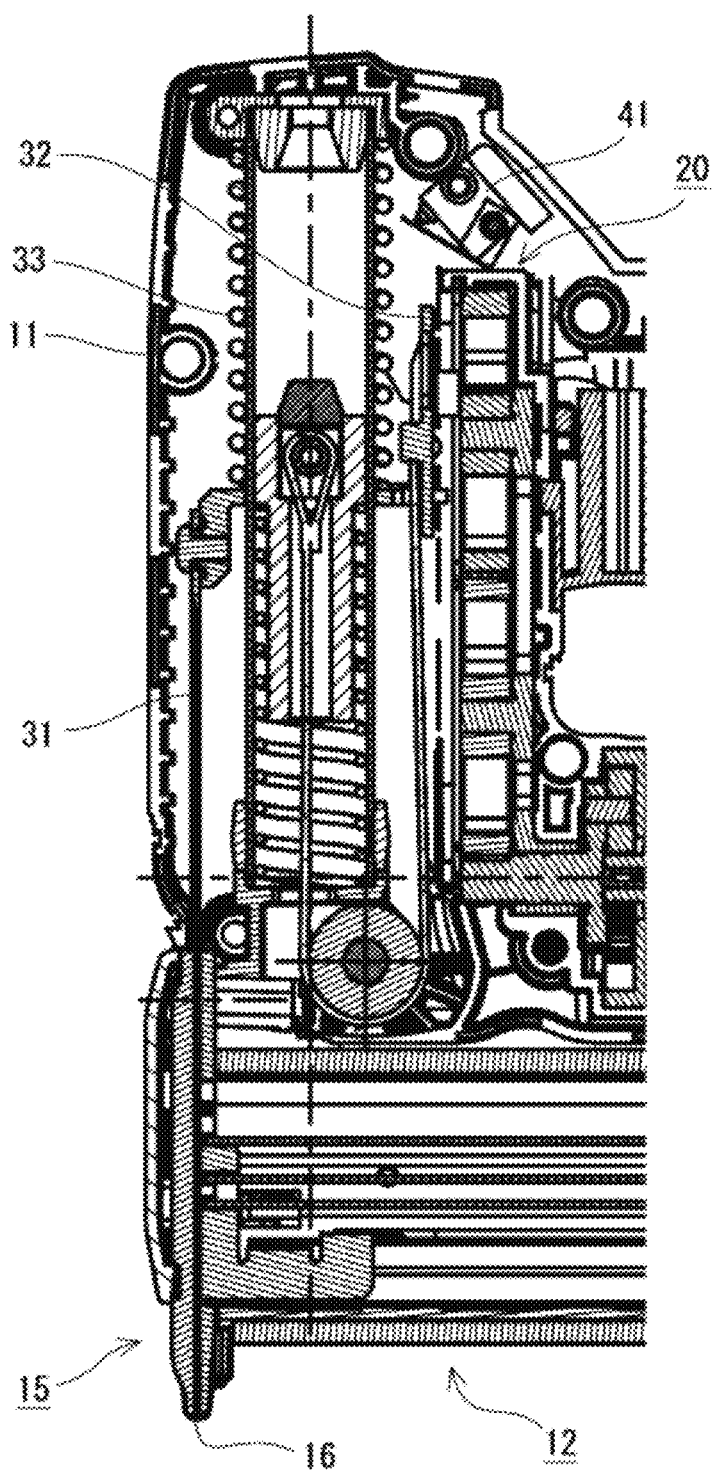
FIG. 8 is a partially enlarged side sectional view illustrating the internal structure of the electric tool in the state where the plunger is located in the normal standby position.

Specifically, when the operation part 14 is operated from a normal standby state shown in FIG. 8, the trigger switch 40 becomes on. The motor drive control unit 110 starts to drive the motor 17 when an operation signal from the trigger switch 40 is received. When the motor 17 is rotated, the drive mechanism 20 is actuated to gradually raise upward the plunger 32.

Figure 10:
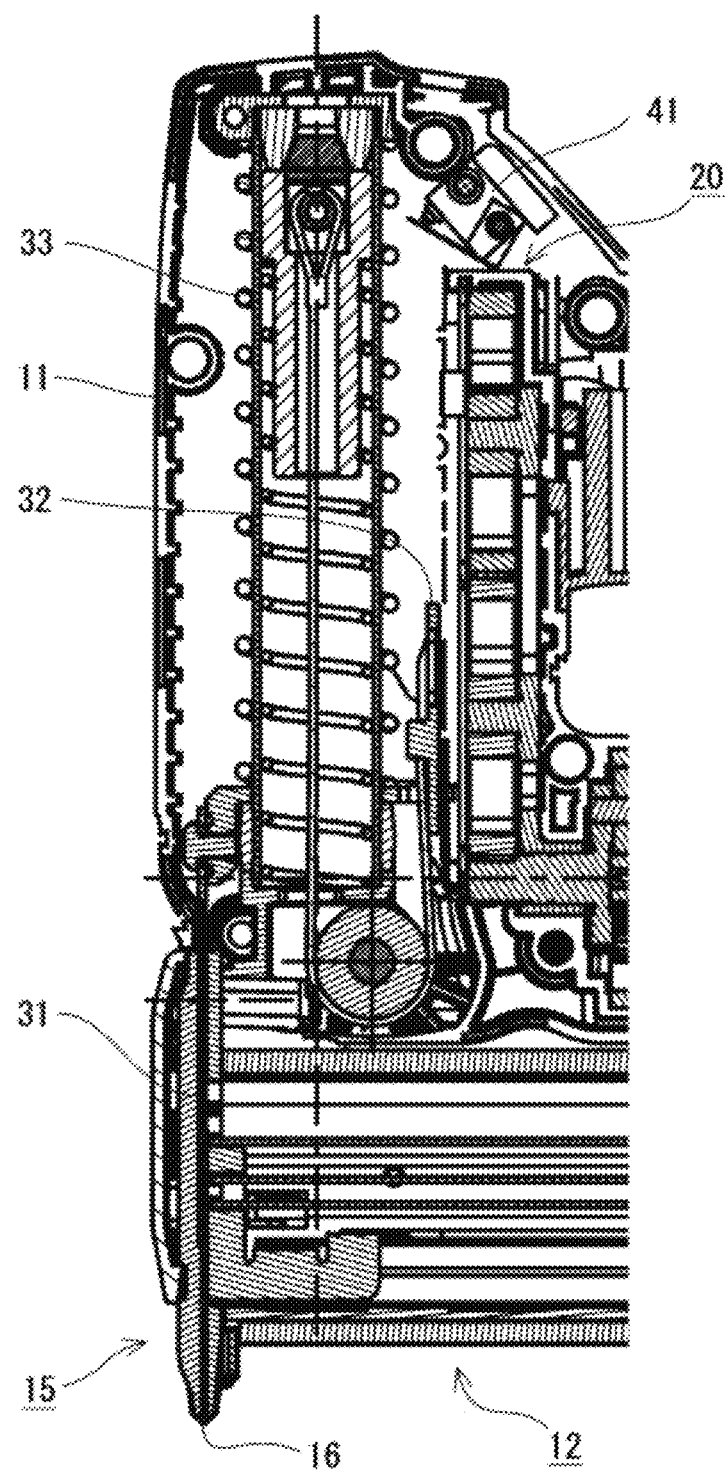
FIG. 10 is a partially enlarged side sectional view illustrating the internal structure of the electric tool in the state where the plunger is located in the bottom dead center.

Then, as shown in FIG. 9, when the plunger 32 is moved to the position of the top dead center, the plunger 32 pushes the brake switch 41. Immediately after that, the engagement between the drive mechanism 20 and the plunger 32 is released and the plunger 32 and the driver 31 are instantaneously moved toward the ejecting port 16 by the urging force accumulated in the plunger urging member 33. Accordingly, as shown in FIG. 10, the plunger 32 is moved to the position of the bottom dead center, so that a fastener is struck out.

Thereafter, when the motor 17 is rotated until it returns to the normal standby state shown in FIG. 8, the motor drive control unit 110 stops the motor 17. At this time, the timing at which the motor 17 is to be stopped is set by measuring a predetermined time period after the brake switch 41 becomes on in the state shown in FIG. 9 until it becomes off again. For example, the motor drive control unit 110 measures 0.5 second after the brake switch 41 becomes off, and stops the motor 17 after 0.5 second. In this way, the motor 17 is stopped after the predetermined time period elapses since the brake switch 41 becomes off (since the fastener is struck), so that the plunger 32 can be moved and stopped in the normal standby position where the predetermined urging force is accumulated in the plunger urging member 33. In this way, when the plunger 32 is stopped in the vicinity of the top dead center, it is possible to shorten a time period after the operation part 14 is operated until a fastener is struck out during a next striking operation. Accordingly, the working operation can be performed smoothly without causing the operator to feel the waiting time.

The temperature determination unit 120 is configured to determine overheating of the motor 17. The temperature determination unit 120 is configured to detect the overheating of the motor 17 by comparing a temperature (estimated temperature) of the motor 17 with a predetermined threshold value set in advance. The temperature determination unit 120 of the exemplary embodiment uses a temperature (temperature of the heat generating part of the motor 17) obtained by estimating an internal temperature of the motor 17, as "temperature of the motor 17", and compares the same with the threshold value.

Figure 15:
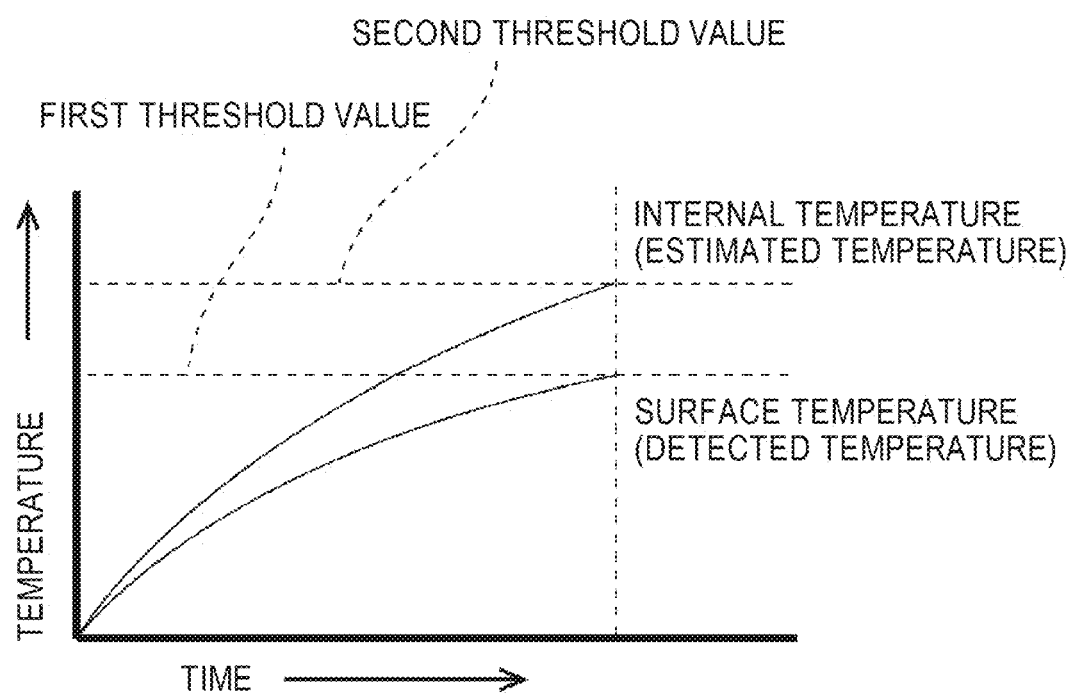
FIG. 15 illustrates a temperature difference between an internal temperature and a surface temperature of the motor.

In the exemplary embodiment, as shown in FIG. 15, a first threshold value and a second threshold value greater than the first threshold value are set as the predetermined threshold value that is used by the temperature determination unit 120. The second threshold value is a fixed value set based on an upper limit temperature at which the motor 17 can be used safely, and is set to 110° C. in the exemplary embodiment. The first threshold value is a fixed value set smaller than the second threshold value so as to notify the operator that the temperature of the motor 17 is close to the upper limit temperature, and is set to 100° C. in the exemplary embodiment.

The temperature determination unit 120 of the exemplary embodiment is configured to estimate an internal temperature of the motor 17 by correcting a temperature detected by the temperature sensor 42 (surface temperature of the motor 17) and to detect the overheating of the motor 17 by comparing the estimated temperature with the first threshold value and the second threshold.

Figure 16A:
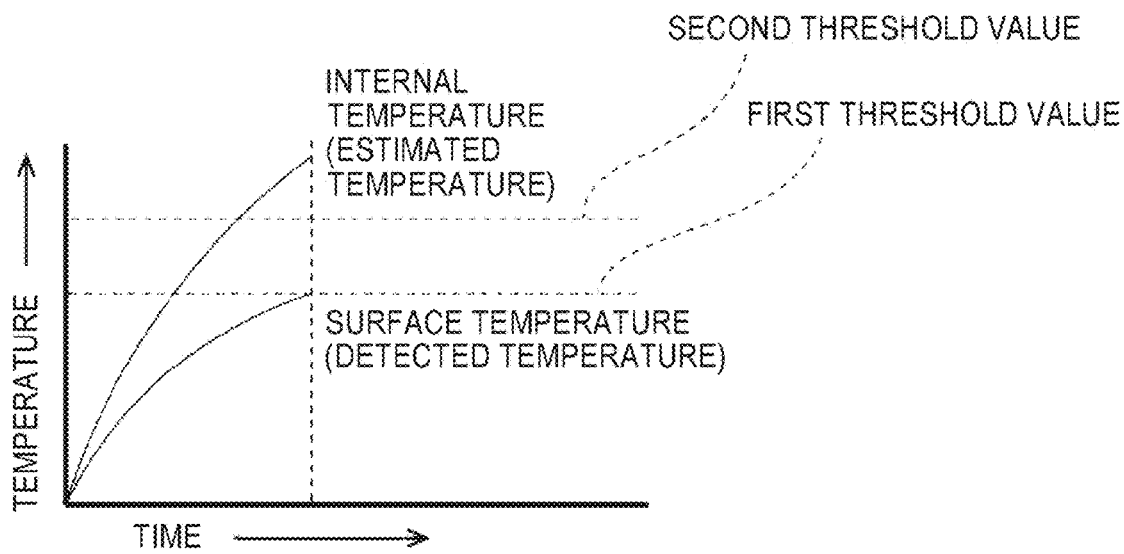
FIG. 16A illustrates the temperature difference between the internal temperature and the surface temperature of the motor when an operation pace is fast.

Herein, a temperature difference between the internal temperature and the surface temperature of the motor 17 changes due to an influence of the operation pace of the operator. That is, as shown in FIG. 16A, when the operation pace is fast (in the case of the striking tool, the striking operation is performed continuously without a break), the internal temperature of the motor 17 (temperature of the winding 17c) rapidly increases. Therefore, the surface temperature (temperature of the motor case 17a) cannot follow up the internal temperature, so that the temperature difference between the temperature detected by the temperature sensor 42 and the internal temperature of the motor 17 tends to increase.

On the other hand, when the operation pace is slow (in the case of the striking tool, the striking operation is performed slowly with an interruption), the internal temperature and the surface temperature of the motor 17 are substantially the same, so that the temperature difference between the temperature detected by the temperature sensor 42 and the internal temperature of the motor 17 is not so large.

Figure 16B:
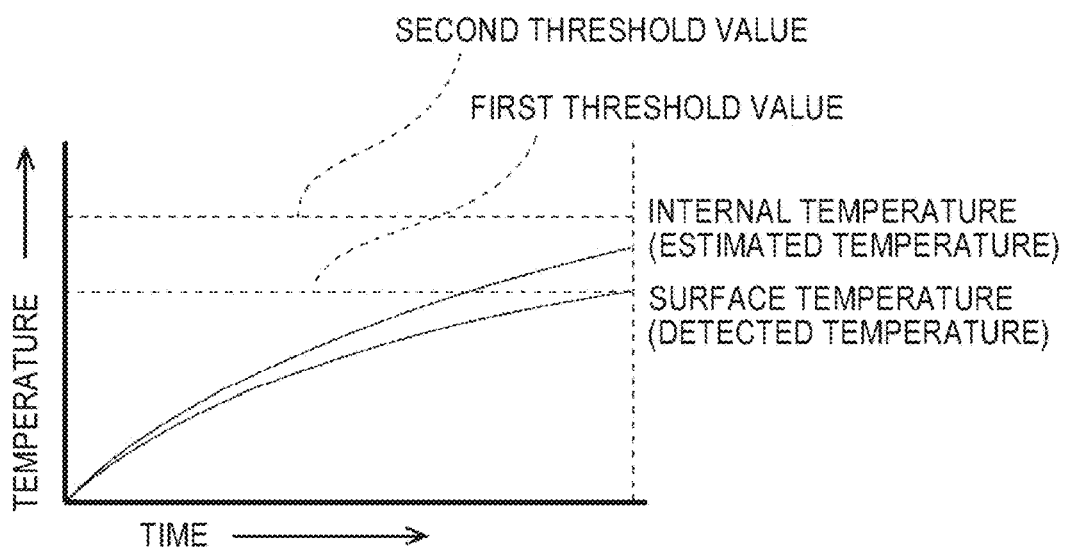
FIG. 16B illustrates the temperature difference between the internal temperature and the surface temperature of the motor when the operation pace is slow.

For example, as shown in FIG. 16A, in the case where the operation pace is fast, when the temperature detected by the temperature sensor 42 reaches the first threshold value, the internal temperature of the motor 17 has significantly exceeded the second threshold value. In contrast, as shown in FIG. 16B, in the case where the operation pace is slow, even when the temperature detected by the temperature sensor 42 reaches the first threshold value, the internal temperature of the motor 17 has not reached the second threshold value.

Accordingly, since the internal temperature of the motor 17 cannot be estimated with accuracy only by the temperature detected by the temperature sensor 42, the temperature determination unit 120 of the exemplary embodiment is configured to calculate the operation pace based on a drive situation of the motor 17, and to estimate the internal temperature of the motor 17 based on the operation pace and the detection result of the temperature sensor 42. In the exemplary embodiment, the temperature determination unit 120 is configured to calculate the operation pace based on the number of drive times of the driver 31 (the number of times of fastener striking).

When it is determined that the internal temperature of the motor 17 estimated by the temperature determination unit 120 exceeds the second threshold value, the motor 17 is determined as being overheated. In the state where the temperature determination unit 120 detects the overheating of the motor 17, the motor drive control unit 110 performs control such that the motor 17 is not to be driven, even when the operation part 14 is operated. Accordingly, the electric tool is not actuated in the high temperature state.

When it is determined that the internal temperature of the motor 17 estimated by the temperature determination unit 120 exceeds the first threshold value, the increase in temperature of the motor 17 is notified to the operator. In the exemplary embodiment, when notifying the increase in temperature of the motor 17 to the operator, a drive mode of the motor 17 is changed for the notification. Specifically, the timing at which the motor 17 is stopped after performing the striking operation is changed to notify the increase in temperature of the motor 17 to the operator.

Specifically, when not performing the notification (when it is determined that the temperature of the motor 17 does not exceed the first threshold value), the plunger 32 is moved and stopped in the normal standby position. On the other hand, when performing the notification (when it is determined that the temperature of the motor 17 exceeds the first threshold value), the plunger 32 is moved and stopped in a notification position (standby position for notification) where the urging force accumulated in the plunger urging member 33 is less than that in the normal standby position.

For example, the motor 17 is stopped immediately after the brake switch 41 becomes off, so that the plunger 32 is stopped in the position of the bottom dead center (notification position; standby position for notification) as shown in FIG. 9. In this way, when the stop position of the plunger 32 is changed, a time period after the operation part 14 is operated until a fastener is struck out at a next striking operation changes. Therefore, the operator can feel uncomfortable intuitively, so that the increase in temperature can be notified to the operator.

In the exemplary embodiment, the above-described notification method is adopted. However, the present invention is not limited thereto, and other notification methods may also be adopted.

For example, the increase in temperature may be notified to the operator by delaying a time period after the operation part 14 is operated until the motor 17 is driven. That is, when not performing the notification, the motor 17 is driven immediately upon the operation on the operation part 14. However, when performing the notification, the motor 17 may not be driven even when the operation part 14 is operated, until a predetermined time period elapses.

Also, the increase in temperature may be notified to the operator by reducing the number of rotations (rotation speed) of the motor 17, as compared to the case where the notification is not performed. As a method of reducing the number of rotations of the motor 17, the motor 17 may be subjected to PWM control to change a duty ratio, thereby changing the number of rotations of the motor 17. Alternatively, a current value to be supplied to the motor 17 may be changed to change the number of rotations of the motor 17.

Further, the increase in temperature may be notified to the operator by using, for example, the LED 43, a buzzer, a vibration motor and the like.

(High-Temperature Detection Processing)

Next, high-temperature detection processing is described. The high-temperature detection processing is processing that is to be performed by the temperature determination unit 120, and includes calculation processing for estimating the internal temperature of the motor 17, comparing the estimated temperature with the threshold value to determine the overheating of the motor 17, and the like. A main flow of the high-temperature detection processing is described with reference to FIG. 11.

Figure 11:
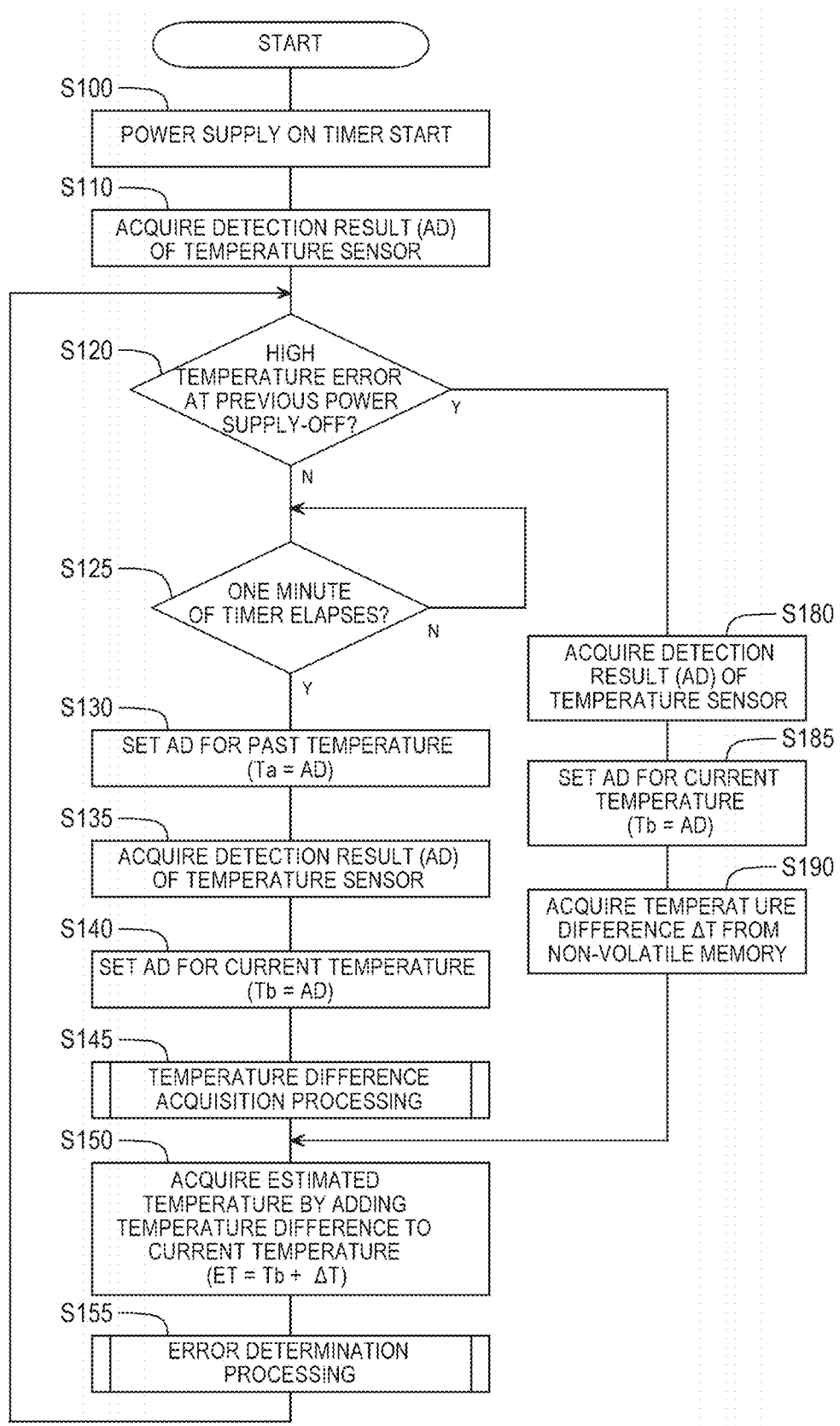
FIG. 11 is a flowchart illustrating high-temperature detection processing.

First, in step S100 of FIG. 11, a power supply of the electric tool 10 becomes on. At this time, a timer starts measurement. Then, the processing proceeds to step S110.

In step S110, the temperature determination unit 120 acquires the detection result (AD) of the temperature sensor 42. Then, the processing proceeds to step S120.

In step S120, it is checked whether a high temperature error flag has been set at the previous power supply-off by referring to the high temperature error flag (refer to step S420) stored in a non-volatile memory. In a case where the high temperature error flag has been set, there is a possibility that the power supply became again on in a high temperature error state (for example, there is a possibility that the operator detached the battery 55 so as to instantaneously solve an error). Therefore, in this case, the processing proceeds to step S180 so as to refer to a previous estimated temperature. On the other hand, in a case where the high temperature error flag has not been set, the processing proceeds to step S125.

When the processing proceeds to step S125, the processing waits until the timer performs the measurement for one minute. When one minute elapses from the measurement start of the timer (step S100) or the reset of the timer (step S450), the processing proceeds to step S130.

In step S130, the detection result (AD) of the temperature sensor 42 is set for a variable (Ta) indicative of a temperature before one minute. Then, the processing proceeds to step S135.

In step S135, the temperature determination unit 120 again acquires the detection result (AD) of the temperature sensor 42. Then, the processing proceeds to step S140.

In step S140, the detection result (AD) of the temperature sensor 42 is set for a variable (Tb) indicative of a current temperature. Then, the processing proceeds to step S145.

In step S145, temperature difference acquisition processing (described later) is performed. In the temperature difference acquisition processing, a temperature difference $\Delta T$ is calculated for correcting the temperature difference between the internal temperature and the surface temperature of the motor 17. Then, the processing proceeds to step S150.

In step S150, the temperature difference ($\Delta T$) is added to the current temperature (Tb) to calculate an estimated temperature (ET). Then, the processing proceeds to step S155.

In step S155, error determination processing (described later) is performed. In the error determination processing, the estimated temperature (ET) is compared with the predetermined threshold value to determine the overheating of the motor 17. Accordingly, one high-temperature detection processing is over, so that the processing returns to step S120.

On the other hand, when the processing proceeds to step S180, the temperature determination unit 120 again acquires the detection result (AD) of the temperature sensor 42. Then, the processing proceeds to step S185.

In step S185, the detection result (AD) of the temperature sensor 42 is set for the variable (Tb) indicative of the current temperature. Then, the processing proceeds to step S190.

In step S190, the temperature difference $\Delta T$ stored in the non-volatile memory is read and restored. Then, the processing proceeds to step S150 and step S155, and the error determination processing is performed using the temperature difference $\Delta T$ stored in the non-volatile memory (the temperature difference $\Delta T$ at the previous power supply-off). Accordingly, one high-temperature detection processing is over, so that the processing returns to step S120.

(Temperature Difference Acquisition Processing)

The temperature difference acquisition processing is processing of calculating the temperature difference $\Delta T$ that is to be used for estimating the temperature of the motor 17. In the temperature difference acquisition processing of the exemplary embodiment, the temperature determination unit 120 calculates the temperature difference $\Delta T$ by using the operation pace (the number of drive times of the driver 31, i.e., the number of times of fastener striking) for a predetermined fixed period (one minute) and the change in temperature detected by the temperature sensor 42 for the fixed period. The temperature difference acquisition processing is described in detail with reference to a flowchart of FIG. 12.

Figure 12:
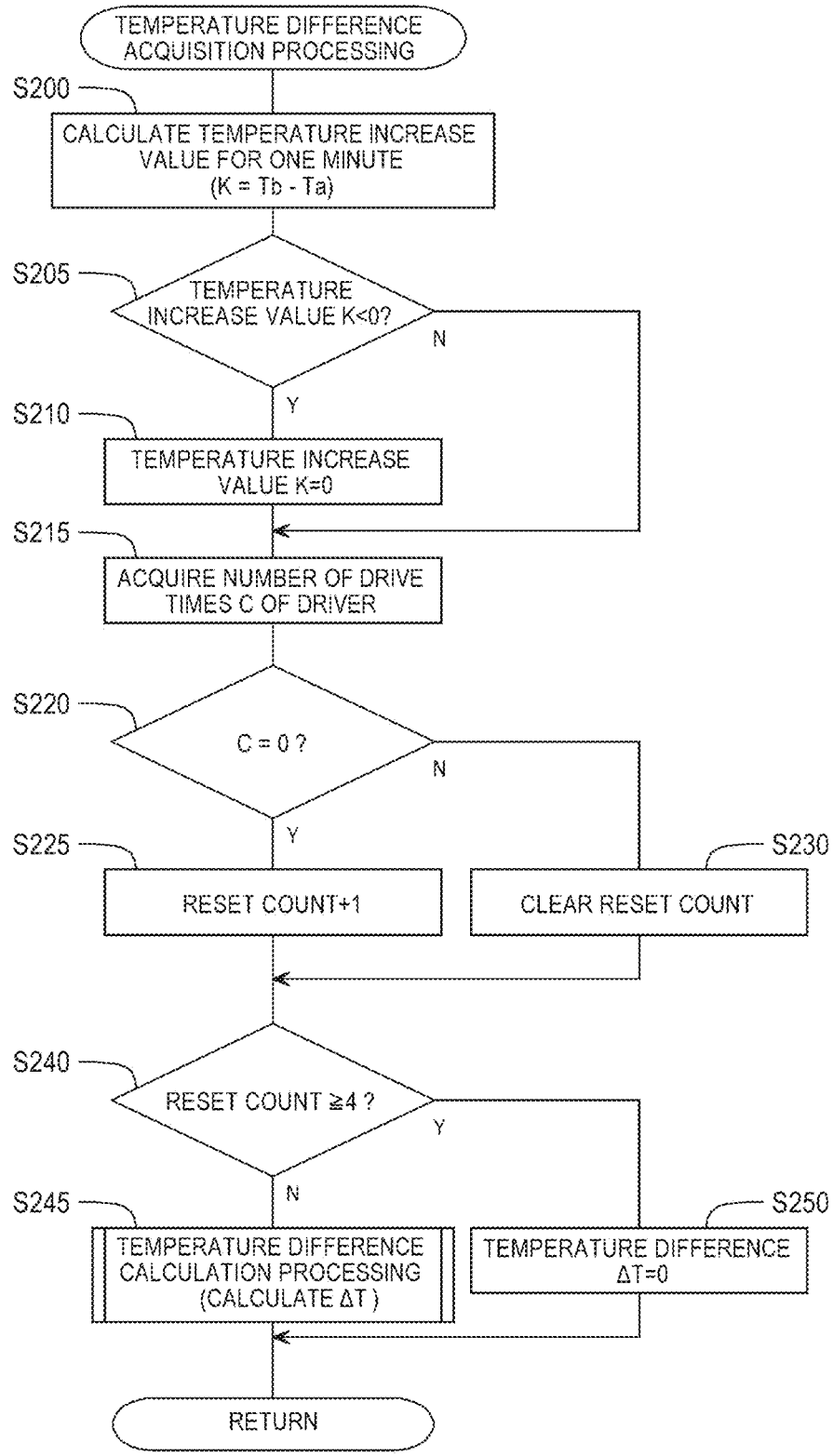
FIG. 12 is a flowchart illustrating temperature difference acquisition processing.

First, in step S200 of FIG. 12, a temperature increase value (K) detected by the temperature sensor 42 for a last fixed period (one minute) is calculated. The temperature increase value (K) is obtained by "Tb−Ta". Then, the processing proceeds to step S205.

In step S205, it is checked whether the temperature increase value (K) is a negative value. When the temperature increase value (K) is a negative value, the processing proceeds to step S210. On the other hand, when the temperature increase value (K) is greater than 0 (zero), the processing proceeds to step S215.

When the processing proceeds to step S210, the temperature increase value (K) is set to "0" because the temperature has lowered for the last one minute. Then, the processing proceeds to step S215.

In step S215, the number of times in which the driver 31 was driven for the last predetermined fixed period (one minute) is acquired. The number of drive times (C) of the driver 31 is cleared every one minute (refer to step S450), and is counted up by 1 each time when the striking operation is performed. When the number of drive times (C) of the driver 31 is acquired, the processing proceeds to step S220.

In step S220, it is checked whether the number of drive times (C) of the driver 31 for one minute is "0". When the number of drive times (C) is "0", the processing proceeds to step S225. On the other hand, when the number of drive times (C) is not "0", the processing proceeds to step S230.

When the processing proceeds to step S225, a reset count is increased by 1. In the meantime, the reset count is a counter for resetting the temperature difference $\Delta T$. Then, the processing proceeds to step S240.

When the processing proceeds to step S230, the reset count is cleared ("0" is set for the reset count). Then, the processing proceeds to step S240.

In step S240, it is checked whether the reset count is "4" or greater. In the exemplary embodiment, when the striking is not performed for 4 minutes or longer, it is determined that the internal temperature and the surface temperature of the motor 17 are the same. When the reset count is smaller than "4", the processing proceeds to step S245. On the other hand, when the reset count is "4" or greater, since the striking is not performed for 4 minutes or longer, the processing proceeds to step S250.

When the processing proceeds to step S245, temperature difference calculation processing (described later) is performed to obtain the temperature difference $\Delta T$. Then, the temperature difference acquisition processing is over.

When the processing proceeds to step S250, it is determined that the motor 17 is not driven for the fixed time or longer and thus there is no difference between the internal temperature and the surface temperature of the motor 17, and "0" is set for the temperature difference $\Delta T$. Then, the temperature difference acquisition processing is over.

(Temperature Difference Calculation Processing)

The temperature difference calculation processing is described in detail with reference to a flowchart of FIG. 13. In the temperature difference calculation processing, some constants to be used for calculation are defined. However, the constants vary depending on condition such as characteristics of the motor 17, a shape and a material of the electric tool, characteristics of the temperature sensor 42 and the arrangement position of the temperature sensor 42 and the like, and optimal values thereof are different depending on the electric tools.

First, in step S300 of FIG. 13, it is checked whether the number of times (C) in which the driver 31 is driven for the last predetermined fixed period (one minute) is 20 times or more. When the number of drive times is 20 times or more, the processing proceeds to step S305. On the other hand, when the number of drive times is less than 20 times, the processing proceeds to step S310.

When the processing proceeds to step S305, the operation pace (P) is calculated by a calculation equation of "600÷C". Then, the processing proceeds to step S315.

When the processing proceeds to step S310, a fixed value ("30", in the exemplary embodiment) is set for the operation pace (P). Then, the processing proceeds to step S315.

In step S315, a tentative temperature difference (M) between the internal temperature and the surface temperature of the motor 17 is calculated. The tentative temperature difference (M) is calculated based on the temperature increase value (K) and the operation pace (P). Specifically, the tentative temperature difference (M) is calculated by a calculation equation of "gK+aP^2−bP+c" (g, a, b and c are constants).

The constants are determined by actually measuring the surface temperature of the motor 17 (the surface temperature of the motor case 17a to which the temperature sensor 42 is attached) and the internal temperature of the motor 17. As a method of actually measuring the internal temperature of the motor 17, a method of applying current having the same magnitude as in a using state to the motor 17 in a state where the rotation of the motor 17 is locked, and measuring the internal temperature (temperature of the winding 17c, and the like) at that time may be adopted.

Figure 17:
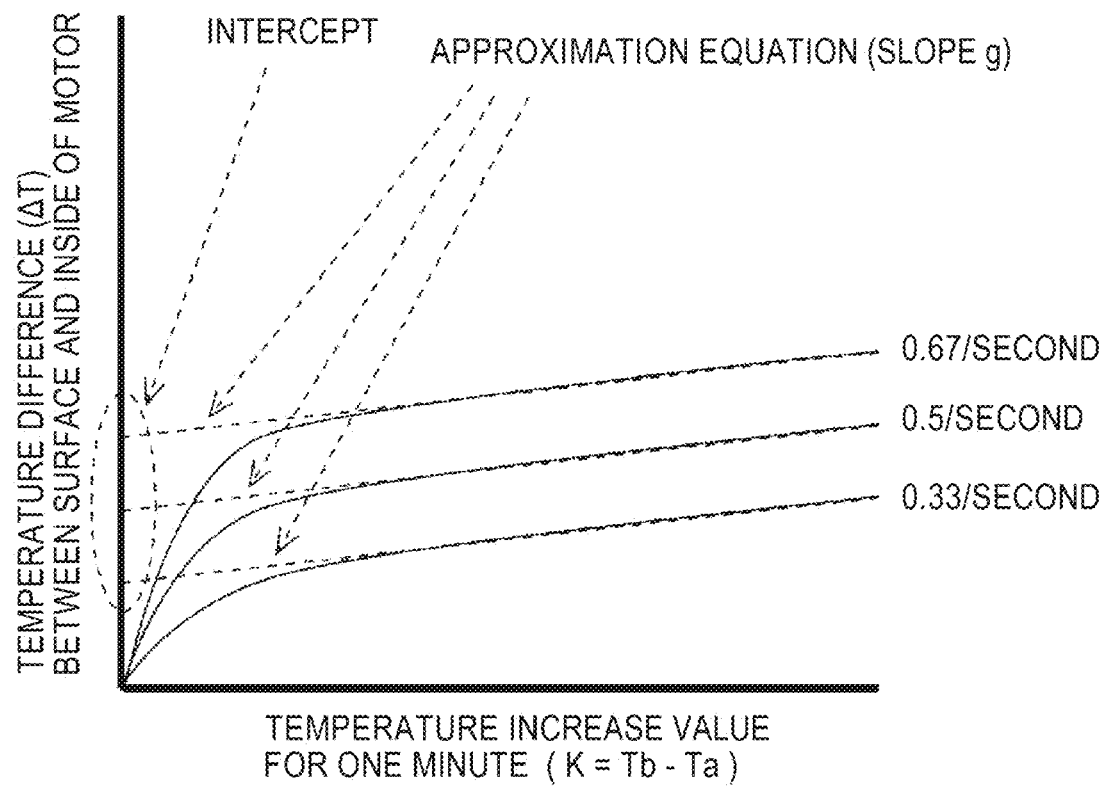
FIG. 17 illustrates actual measurement results of increase values for one minute of the surface temperature of the motor detected by a temperature sensor, and the temperature difference between the surface temperature and the internal temperature of the motor.

FIG. 17 is a graph illustrating a result of the actual measurement. A horizontal axis of the graph indicates the temperature increase value (K=Tb−Ta) for one minute in the detection result of the temperature sensor 42 acquired every one minute. A vertical axis of the graph indicates the temperature difference (actually measured value of $\Delta T$) between the internal temperature and the surface temperature of the motor 17 actually measured. As shown in FIG. 17, immediately after the drive starts, there is a zone in which the increase in surface temperature does not follow up the increase in internal temperature of the motor 17. However, when the temperature increases to some extent, the temperature increase value and the temperature difference are stabilized at a fixed slope. When calculating the constants g, a, b and c, an approximation equation in a part stabilized at the fixed slope is used. That is, a slope of the approximation equation is used as the constant g of the calculation equation. An intercept of the approximation equation varies depending on the operation pace. That is, as shown in FIG. 17, a value of the intercept of the approximation equation is greater in a case where the striking is performed at the pace of 0.5 per second than in a case where the striking is performed at the pace of 0.33 per second. A value of the intercept of the approximation equation is greater in a case where the striking is performed at the pace of 0.67 per second than in the case where the striking is performed at the pace of 0.5 per second. Since the value of the intercept is different depending on the operation pace, the part "aP^2−bP+c" in the calculation equation is provided to obtain the intercept based on the operation pace. The values of a, b and c can be obtained based on a relation between the actually measured operation pace (P) and the intercept.

When the tentative temperature difference (M) is calculated by the calculation equation, the processing proceeds to step S320.

In step S320, an average value of the tentative temperature differences (M) in the past four times is calculated, which is then set for the variable $\Delta T$ indicative of the temperature difference. If there is no data of the past four times, an average value of the present data is set for the temperature difference $\Delta T$. By using the average value, the accuracy of the temperature correction is improved by leveling out the data bias every one minute. When the temperature difference $\Delta T$ is obtained by the calculation as described above, the temperature difference calculation processing is over.

(Error Determination Processing)

The error determination processing is described in detail with reference to a flowchart of FIG. 14. The threshold values that are used in the error determination processing are just examples, and can be changed as appropriate, considering the characteristics of the motor 17 to be used, and the like.

Figure 14:
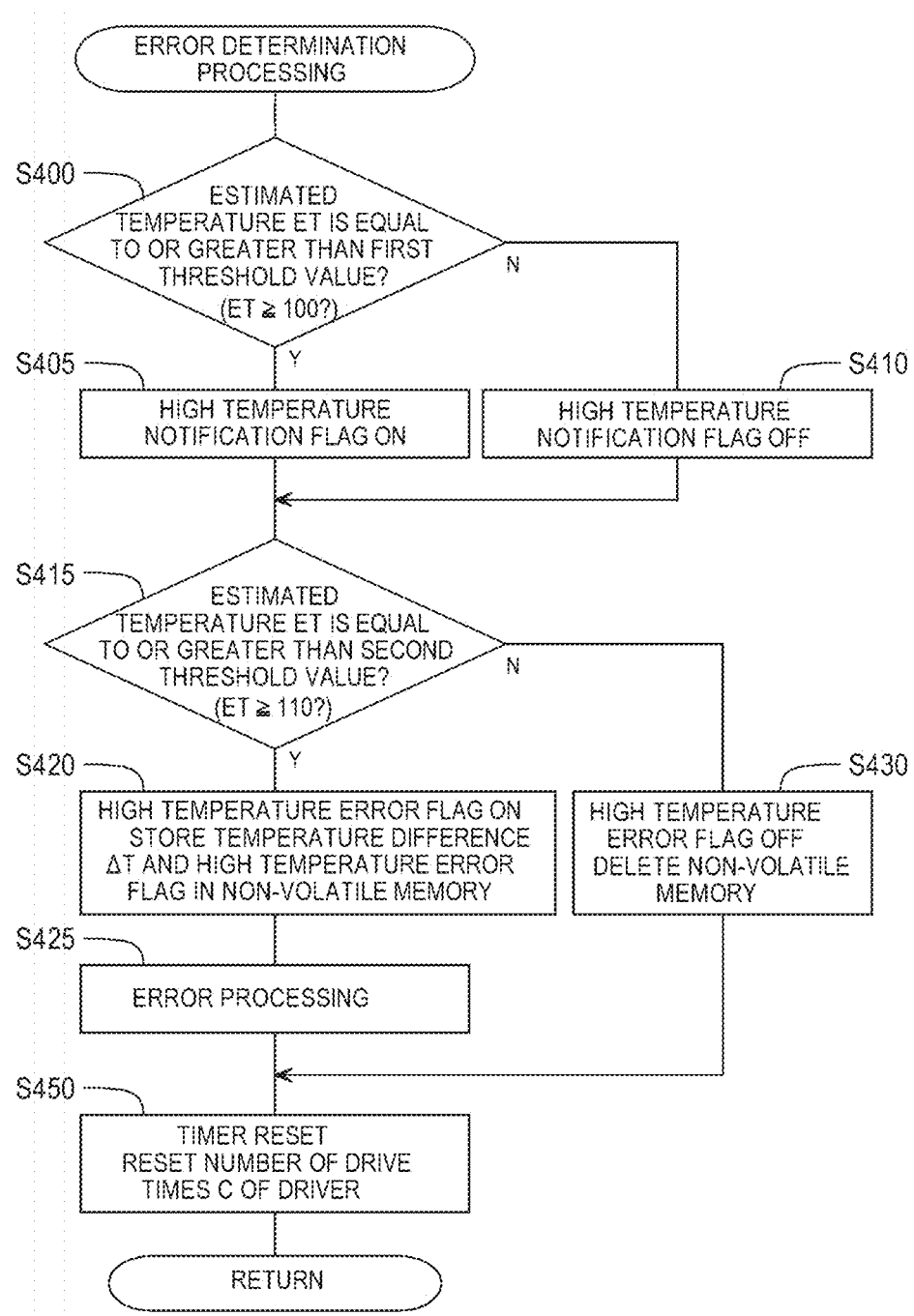
FIG. 14 is a flowchart illustrating error determination processing.

First, in step S400 of FIG. 14, it is checked whether the estimated temperature (ET) obtained in step S150 is equal to or greater than the first threshold value (100° C., in the exemplary embodiment). When the estimated temperature (ET) is equal to or greater than the first threshold value, the processing proceeds to step S405. On the other hand, when the estimated temperature (ET) is less than the first threshold value, the processing proceeds to step S410.

When the processing proceeds to step S405, a high temperature notification flag is set to ON. When the high temperature notification flag is set to ON, predetermined notification processing is performed. In the exemplary embodiment, when the operation part 14 is operated and the striking operation is thus performed in the state where the high temperature notification flag is ON, the plunger 32 is stopped in the notification position (the standby position for notification) after the striking is completed. Then, the processing proceeds to step S415.

When the processing proceeds to step S410, if the high temperature notification flag is ON, the high temperature notification flag is set to OFF. Then, the processing proceeds to step S415. That is, when the temperature determination unit 120 determines that the temperature decreases below the first threshold value, the notification is canceled by for example returning the drive mode of the motor 17 to the normal mode.

In step S415, it is checked whether the estimated temperature (ET) obtained in step S150 is equal to or greater than the second threshold value (110° C., in the exemplary embodiment). When the estimated temperature (ET) is equal to or greater than the second threshold value, the processing proceeds to step S420. On the other hand, when the estimated temperature (ET) is less than the second threshold value, the processing proceeds to step S430.

When the processing proceeds to step S420, the high temperature error flag is set to ON because the estimated temperature of the motor 17 exceeds the using upper limit temperature of the motor 17. Also, the information indicating that the high temperature error flag is ON, and the current temperature difference ΔT are stored in the non-volatile memory. Accordingly, even when the power supply again becomes on after the power supply becomes off, the information indicating that the high temperature error flag is ON and the value of the current temperature difference ΔT can be restored. In the meantime, in the state where the high temperature error flag is ON, the motor 17 is not drive even when the operation part 14 is operated. Then, the processing proceeds to step S425.

In step S425, predetermined error processing is performed. For example, processing of blinking the LED 43 is performed. Then, the processing proceeds to step S450.

In the meantime, when the processing proceeds to step S430, if the high temperature error flag is ON, the high temperature error flag is set to OFF. If the high temperature error flag and the temperature difference ΔT are stored in the non-volatile memory, those information are deleted. Also, when the error processing such as blinking the LED 43 is being performed, for example, the error processing is stopped. Then, the processing proceeds to step S450.

In step S450, the timer is reset and is caused to again start the measurement for one minute. Also, the number of drive times (C) of the driver 31 is reset. Accordingly, the error determination processing is over.

SUMMARY

As described above, according to the exemplary embodiment, the temperature determination unit 120 configured to determine the overheating of the motor 17 is provided. The temperature determination unit 120 is configured to calculate the operation pace based on the drive situation of the motor 17, and to estimate the temperature of the motor 17 based on the operation pace and the detection result of the temperature sensor 42. According to this configuration, even in a case where the temperature sensor 42 cannot be attached to the heat generating part such as the winding 17c and the brush and the temperature difference occurs between the detected temperature of the temperature sensor 42 and the actual temperature of the heat generating part, the estimation error of the temperature of the motor 17 can be reduced. For example, when the motor 17 is continuously driven and the operation pace is thus fast, the temperature of the motor 17 rapidly increases. In this case, the surrounding temperature cannot follow up the temperature of the motor 17, so that the temperature difference between the surrounding temperature detected by the temperature sensor 42 and the actual temperature of the motor 17 increases. In this case, the temperature is corrected on assumption of the large temperature difference. In contrast, when the operation pace is slow, since the temperature difference between the surrounding temperature and the actual temperature of the motor 17 is small, the temperature of the motor 17 is estimated with reducing the correction value. By performing such processing, the accuracy of the temperature detection is improved, so that the overload of the motor 17 can be accurately detected. For example, it may be possible to avoid problems that a protection function does not operate even though the temperature of the motor 17 exceeds the upper limit and thus a failure occurs, and that the protection function operates even though the temperature of the motor 17 does not increase so much, thereby lowering the operability. The protection function accurately operates, so that the motor 17 can be safely used without using a high-output motor. Therefore, the weight reduction and miniaturization of the electric tool 10 can be realized.

In the meantime, the motor drive control unit 110 does not drive the motor 17 even when the operation part 14 is operated in the state where the temperature determination unit 120 detects the overheating of the motor 17. According to this configuration, the motor 17 can be prevented from being used in the overheating state.

The temperature determination unit 120 is configured to estimate the temperature of the motor 17 at least using the operation pace for the predetermined fixed period and the increase in temperature detected by the temperature sensor 42 for the fixed period. According to this configuration, the temperature detection can be realized with higher accuracy.

In the exemplary embodiment, the striking tool is exemplified as the electric tool 10, and the temperature determination unit 120 is configured to calculate the operation pace based on the number of drive times of the driver 31. In the striking tool, the operation pace can be easily calculated by referring to the number of drive times of the driver 31.

The method of calculating the operation pace is not limited to the method of referring to the number of drive times of the driver 31, as described in the exemplary embodiment. For example, the operation pace may be calculated using a drive time period of the motor 17, the number of drive times of the motor 17, an integrated value of supply currents to the motor 17, and the like.

In the exemplary embodiment, the surface temperature of the motor 17 is detected by the temperature sensor 42. However, the present invention is not limited thereto. For example, the temperature sensor 42 may be configured to detect temperatures of the battery, the substrate, an FET and the like. When detecting temperatures of the battery, the substrate, an FET and the like, the temperature sensor 42 may be arranged in any position where changes in temperatures of the battery, the substrate, an FET and the like can be measured. For example, the temperature sensor 42 may be arranged in a space close to but not contacting the components or the temperature sensor 42 may be attached to a main body housing that surrounds the components.

The change in temperature may be estimated from a deformation amount due to temperature by using a strain gauge or the like, instead of using the temperature sensor 42 such as a thermistor, as the temperature detection means.

In the exemplary embodiment, the temperature of the heat generating part of the motor 17 is estimated, considering the increase in temperature, which is different depending on the operation pace. However, the threshold value may be changed instead of estimating the temperature. That is, based on a knowledge that the temperature difference between the detected temperature of the temperature sensor 42 and the actual temperature of the heat generating part varies depending on the operation pace, the determination threshold value (the first threshold value or the second threshold value) may be changed depending on the drive situation of the motor 17 for the predetermined fixed period, and the determination threshold value and the output of the temperature sensor 42 may be compared to determine the overheated state of the motor 17. This processing may be implemented by a similar calculation to the above exemplary embodiment. That is, in the exemplary embodiment, the temperature difference ΔT obtained by the calculation is added to the detected temperature of the temperature sensor 42. Instead of this configuration, the temperature difference ΔT obtained by the calculation may be subtracted from the determination threshold value (the first threshold value or the second threshold value).

Further, according to the exemplary embodiment, the first threshold value and the second threshold value greater than the first threshold value are set. When it is determined that the temperature of the motor 17 exceeds the first threshold value, the increase in temperature of the motor 17 is notified to the user, and when it is determined that the temperature of the motor 17 exceeds the second threshold value, the motor 17 is controlled not to drive even though the operation unit 14 is operated. According to this configuration, when the temperature of the motor 17 increases, the notification to the user is first performed, and then when the temperature of the motor 17 further increases, the output of the motor 17 is limited. Therefore, even when the motor 17 is in the high temperature and the tool cannot be thus used, the notification to the user is performed beforehand, so that the problem of the sudden interruption of working operation can be avoided.

The notification to the operator is performed by changing the drive mode of the motor 17. According to this configuration, the operator can feel uncomfortable due to the drive of the motor 17, so that the operator can feel the increase in temperature of the motor 17 intuitively.

Specifically, in the striking tool configured to strike a fastener from the ejecting port 16, when not performing the notification, the plunger 32 is moved and stopped in the normal standby position where the predetermined urging force is accumulated in the plunger urging member 33, after striking out a fastener by the driver 31. When performing the notification, the plunger 32 is moved and stopped in the standby position for notification where the urging force accumulated in the plunger urging member 33 is less than in the normal standby position. That is, a distance to the position of the top dead center is set greater for the plunger 32 located in the standby position for notification than for the plunger 32 located in the normal standby position. According to this configuration, in the case where the notification is being performed, the time period after the operator operates the operation unit until a fastener is actually struck out is longer than the case where the notification is not performed. In this way, the time for striking is prolonged, so that the operator can recognize the increase in temperature of the motor 17 sensuously. Also, since the time for striking is prolonged, there is also an interval between the striking operations, so that the increase in temperature can be suppressed by reducing load of the motor 17.

In the exemplary embodiment, the information indicating that the high temperature error flag is ON is stored in the non-volatile memory. In addition to this, the information indicating that the high temperature notification flag is ON may be stored in the non-volatile memory. Accordingly, even when the power supply becomes off in the state where the high temperature notification flag is ON and then the power supply again becomes on, the state of the high temperature notification flag is restored to keep the notification state.

In the exemplary embodiment, when it is determined that the temperature of the motor 17 exceeds the second threshold value, the motor 17 is controlled not to drive. However, the present invention is not limited thereto. For example, the motor 17 may be driven with reducing the output. In this case, a mode in which the motor 17 is driven with reducing the output and a mode in which the increase in temperature of the motor 17 is notified to the user may be set different from each other.

The invention claimed is:

1. An electric tool comprising:
    a motor;
    an operation part provided to be operable by a user;
    a motor drive control unit configured to perform control of driving the motor in response to the operation part being operated;
    a temperature sensor; and
    a temperature determination unit configured to determine overheating of the motor,
    wherein the temperature determination unit is configured to correct a detection result of the temperature sensor by a correction amount corresponding to a drive situation of the motor to estimate a temperature of the motor, and to determine the overheating of the motor based on the estimated temperature, and
    wherein the drive situation of the motor is (i) a number of drive times of the motor in a predetermined fixed period, with the number of drive times being a number of activations of the motor in the predetermined fixed period and with each activation corresponding to a driving operation of the tool, or (ii) an operation pace of the motor calculated using an integrated value of supply currents to the motor in the predetermined fixed period.

2. The electric tool according to claim 1,
wherein the motor drive control unit is configured to limit an output of the motor when the operation part is operated in a state where the temperature determination unit detects the overheating of the motor.

3. The electric tool according to claim 1,
wherein the temperature determination unit is configured to use a correction value which is at least based on the drive situation of the motor for a predetermined fixed period and a change in temperature detected by the temperature sensor for the fixed period, so as to estimate the temperature of the motor.

4. The electric tool according to claim 3,
wherein the temperature determination unit is configured to use the correction value which is at least based on a drive time period of the motor for the predetermined fixed period and the change in temperature detected by the temperature sensor for the fixed period, so as to estimate the temperature of the motor.

5. The electric tool according to claim 1, further comprising:
a driver configured to be driven by the motor and to strike out a fastener from an ejecting port provided at a tip end of the tool,
wherein the temperature determination unit is configured to calculate an operation pace based on a number of drive times of the driver, and to correct the detection result of the temperature sensor based on the calculated operation pace, so as to estimate the temperature of the motor.

6. The electric tool according to claim 1,
wherein the temperature determination unit is configured to:
use a first correction value to correct the detection result of the temperature sensor in a first drive situation where a number of drive times of the motor is larger; and
user a second correction value which is smaller than the first correction value to correct the detection result of the temperature sensor in a second drive situation where the number of drive times of the motor is smaller.

7. The electric tool according to claim 1,
wherein the temperature determination unit is configured to correct the detection result of the temperature sensor based on a drive time period of the motor, a number of drive times of the motor or an integrated value of supply currents to the motor in a predetermined fixed period and to determine the overheating of the motor based on the estimated temperature.

8. An electric tool comprising:
a motor;
an operation part provided to be operable by a user;
a motor drive control unit configured to perform control of driving the motor in response to the operation part being operated;
a temperature sensor; and
a temperature determination unit configured to determine overheating of the motor,
wherein the temperature determination unit is configured to compare a determination threshold value which varies depending on a drive situation of the motor for a predetermined fixed period, and an output of the temperature sensor, and to determine an overheated state of the motor in response to a determination that the output of the temperature sensor exceeds the determination threshold value, and
wherein the temperature determination unit changes the determination threshold value in response to an operation pace of the motor.

9. The electric tool according to claim 8,
wherein the temperature determination unit is configured to determine the determination threshold value for determining the overheated state of the motor at least using the drive situation of the motor for the predetermined fixed period and the a change in temperature detected by the temperature sensor for the fixed period.

10. The electric too according to claim 8,
wherein the temperature determination unit is configured to:
compare a first determination threshold value and the output of the temperature sensor in a first drive situation where a number of drive times of the motor is larger; and
compare a second determination threshold value which is larger than the first determination threshold value in a second drive situation where the number of drive times of the motor is smaller, so as to determine the overheated state of the motor.

11. The electric tool according to claim 8, wherein the determination threshold value is a difference between an internal temperature and a surface temperature of the motor.

12. The electric tool according claim 8, further comprising:
a driver configured to be driven by the motor, wherein the operation pace is determined based on a number of drive times of the driver in a predetermined fixed period.

13. The electric tool according to claim 8, wherein (i) the operation pace of the motor is determined by a number of drive times of the motor in a predetermined fixed period, with the number of drive times being a number of activations of the motor in the predetermined fixed period and with each activation corresponding to a driving operation of the tool, or (ii) the operation pace of the motor is calculated using an integrated value of supply currents to the motor in the predetermined fixed period.

14. An electric tool comprising:
a motor;
an operation part provided to be operable by a user;
an actuation member;
a drive mechanism configured to use the motor as a power source to drive the actuation member; and
a control device including:
a motor drive control unit configured to perform control of driving the motor in response to the operation part being operated; and
a temperature determination unit configured to compare a temperature of a heat generating part with a predetermined threshold value, wherein a first threshold value and a second threshold value greater than the first threshold value are set as the predetermined threshold value,
wherein the control device is configured to control the drive mechanism to:
stop the actuation member at a first stop position when the temperature determination unit determines that the temperature of the heat generating part is not higher than the first threshold value;
stop the actuation member at a second stop position different from the first stop position to notify a user of an increase in temperature when the temperature determination unit determines that the temperature of the heat generating part is higher than the first threshold value, and limit an output of the motor when the temperature determination unit determines that the temperature of the heat generating part is higher than the second threshold value.

15. The electric tool according to claim 14, further comprising:

a driver provided to be slidable toward an ejecting port provided at a tip end of the tool to strike out a fastener from the ejecting port, wherein the actuation member is a plunger to which the driver is coupled; and a plunger urging member configured to urge the plunger toward the ejecting port, wherein the drive mechanism is configured to move the plunger to accumulate an urging force in the plunger urging member, and wherein the control device is configured to control the drive mechanism to:

stop the plunger at the first stop position when the temperature determination unit determines that the temperature of the heat generating part is not higher than the first threshold value;

stop the plunger at the second stop position different from the first stop position when the temperature determination unit determines that the temperature of the heat generating part is higher than the first threshold value.

16. The electric tool according to claim 15, wherein the control device is configured to control the drive mechanism to:

move the plunger to and stop the plunger at a normal standby position which is the first stop position where a predetermined urging force is accumulated in the plunger urging member; and move the plunger to and stop the plunger at a standby position for notification which is the second stop position where the urging force accumulated in the plunger urging member is less than in the normal standby position.

17. The electric tool according to claim 14, wherein the control device is configured to perform notification by delaying a time period after the operation part is operated until the motor is driven.

18. The electric tool according to claim 14, wherein the control device is configured to perform notification by reducing a rotation speed of the motor as compared to a case where the notification is not performed.

* * * * *